US008967040B2

(12) United States Patent
Fritz et al.

(10) Patent No.: US 8,967,040 B2
(45) Date of Patent: Mar. 3, 2015

(54) METHODS AND APPARATUS FOR COMPACTING TRASH

(75) Inventors: Robert J. Fritz, Glendale, CA (US); Michael T. Zimmerman, Jr., Laguna Beach, CA (US); William Godecker, Irvine, CA (US)

(73) Assignee: B/E Aerospace, Inc., Wellington, FL (US)

( * ) Notice: Subject to any disclaimer, the term of this patent is extended or adjusted under 35 U.S.C. 154(b) by 361 days.

(21) Appl. No.: 13/239,639

(22) Filed: Sep. 22, 2011

(65) Prior Publication Data

US 2012/0067230 A1 Mar. 22, 2012

Related U.S. Application Data

(60) Provisional application No. 61/385,291, filed on Sep. 22, 2010.

(51) Int. Cl.
*B30B 13/00* (2006.01)
*B30B 15/30* (2006.01)
*B30B 15/32* (2006.01)
(Continued)

(52) U.S. Cl.
CPC .............. *B30B 9/3014* (2013.01); *B30B 9/3007* (2013.01); *B30B 9/3042* (2013.01); *B30B 9/3057* (2013.01); *B30B 9/3032* (2013.01);
(Continued)

(58) Field of Classification Search
CPC .. B30B 9/3007; B30B 9/3014; B30B 9/3042; B30B 9/3057; B30B 9/3096; B30B 9/3032; Y02T 50/46; B64D 11/04

USPC ....... 100/35, 180, 215, 226, 227, 228, 229 R, 100/229 A, 246, 247, 250, 902, 45, 100, 218
See application file for complete search history.

(56) References Cited

U.S. PATENT DOCUMENTS 3,481,268 A * 12/1969 Szilagyi et al. ................. 100/49
3,501,890 A *  3/1970 Hunt ............................. 53/529
(Continued)

FOREIGN PATENT DOCUMENTS

DE           337607 C     6/1921
WO        95/24307 A1    9/1995
(Continued)

OTHER PUBLICATIONS

Supplementary European Search Report and Written Opinion of the European Patent Office issued in related application EP11827511.4, Apr. 30, 2014, 9 pages.
(Continued)

*Primary Examiner* — Jimmy T Nguyen
(74) *Attorney, Agent, or Firm* — Drinker Biddle & Reath LLP

(57) ABSTRACT

Methods and apparatus for compacting trash are disclosed. A disclosed example trash compacting system includes a trash receptacle, a collection bin, a compaction bin proximal to the collection bin, having a receiving opening to receive trash via the trash receptacle, and having an ejection opening through which compacted trash is ejected into the collection bin, and a compactor mechanism operatively coupled with the compaction bin to compact the trash within the compaction bin.

12 Claims, 38 Drawing Sheets

(51) Int. Cl.
B30B 9/30 (2006.01)
B64D 11/04 (2006.01)

(52) U.S. Cl.
CPC .............. B30B 9/3096 (2013.01); B64D 11/04 (2013.01); Y02T 50/46 (2013.01)
USPC .............. 100/35; 100/45; 100/215; 100/218; 100/226; 100/229 A; 100/100

(56) References Cited

U.S. PATENT DOCUMENTS

| | | | |
|---|---|---|---|
| 3,514,969 A | | 6/1970 | Harza |
| 3,561,352 A | * | 2/1971 | Hirsch .......................... 100/351 |
| 3,608,476 A | * | 9/1971 | Price et al. ....................... 100/35 |
| 3,613,566 A | * | 10/1971 | Shapleigh et al. .............. 100/218 |
| 3,650,120 A | * | 3/1972 | Harza ............................... 62/62 |
| 3,654,855 A | | 4/1972 | Longo |
| 3,659,427 A | * | 5/1972 | Harza ............................... 62/63 |
| 3,722,403 A | * | 3/1973 | Longo ............................. 100/49 |
| 3,734,006 A | | 5/1973 | Hennells |
| 3,754,501 A | | 8/1973 | Horn |
| 3,754,503 A | | 8/1973 | Hennells |
| 3,882,771 A | | 5/1975 | Frohbieter |
| 3,907,087 A | * | 9/1975 | Tanaka .......................... 194/209 |
| 4,044,569 A | | 8/1977 | Harza |
| 4,703,611 A | | 11/1987 | Young |
| 5,259,304 A | | 11/1993 | Roberts |
| 5,490,455 A | * | 2/1996 | Conti et al. ...................... 100/50 |
| 5,873,304 A | | 2/1999 | Ruf |
| 2010/0307350 A1 | * | 12/2010 | Cunningham et al. .......... 100/35 |

FOREIGN PATENT DOCUMENTS

| | | |
|---|---|---|
| WO | 98/56691 A1 | 12/1998 |
| WO | 02/064458 A2 | 8/2002 |
| WO | 2010/034494 A1 | 4/2010 |

OTHER PUBLICATIONS

Office Action issued in related application JP2013-529442, Jun. 25, 2014, 7 pages.

Office Action issued in related application CN201180045579.8, Jun. 26, 2014, 19 pages.

* cited by examiner

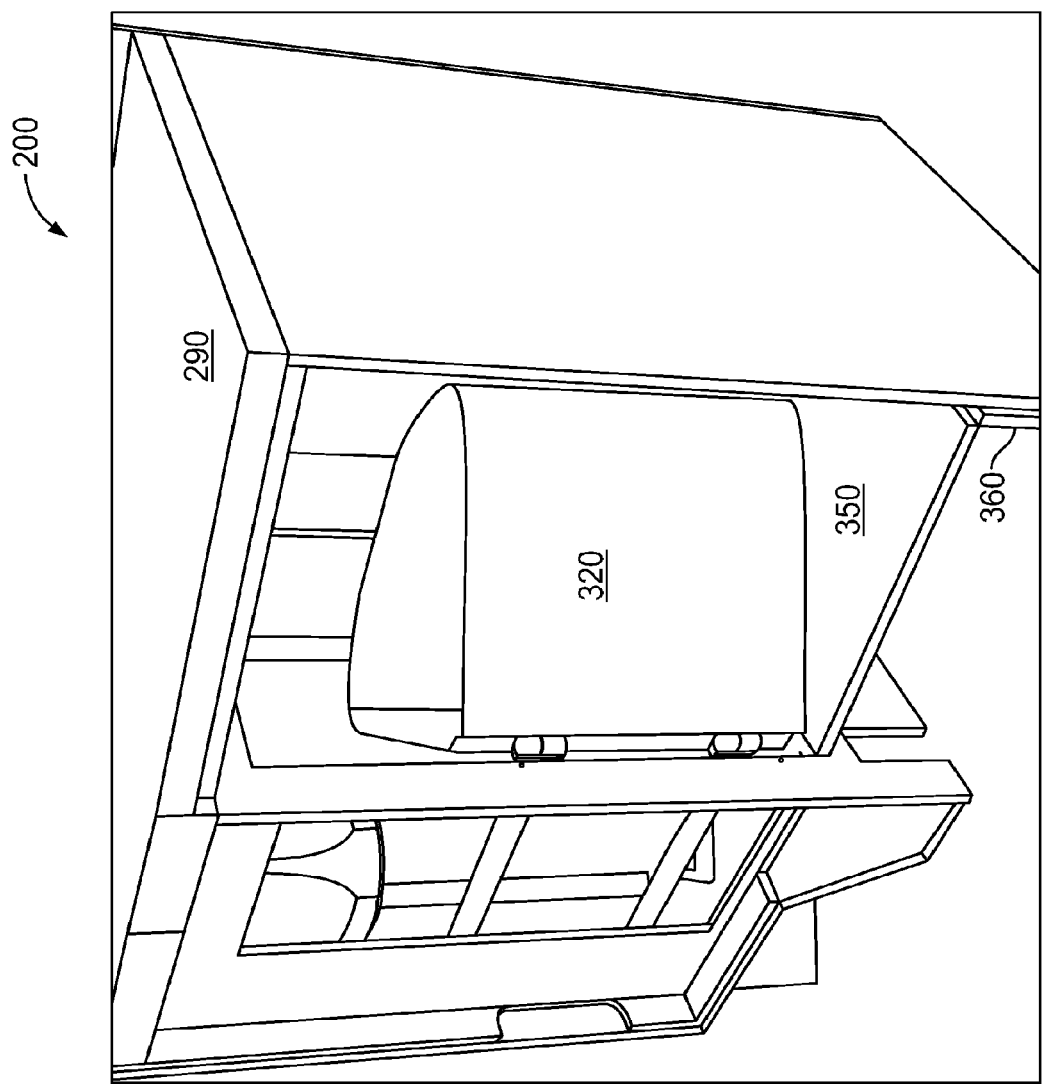

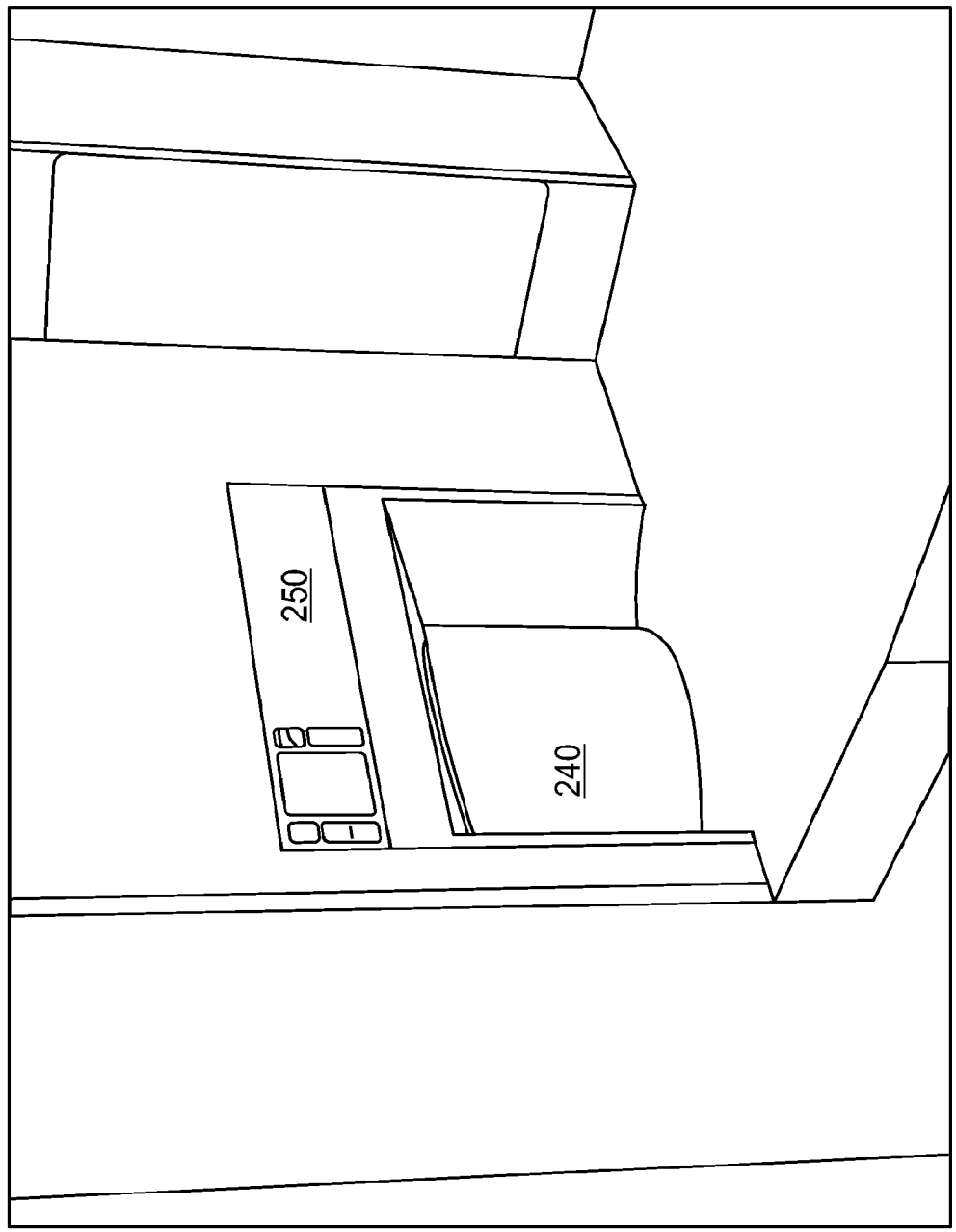

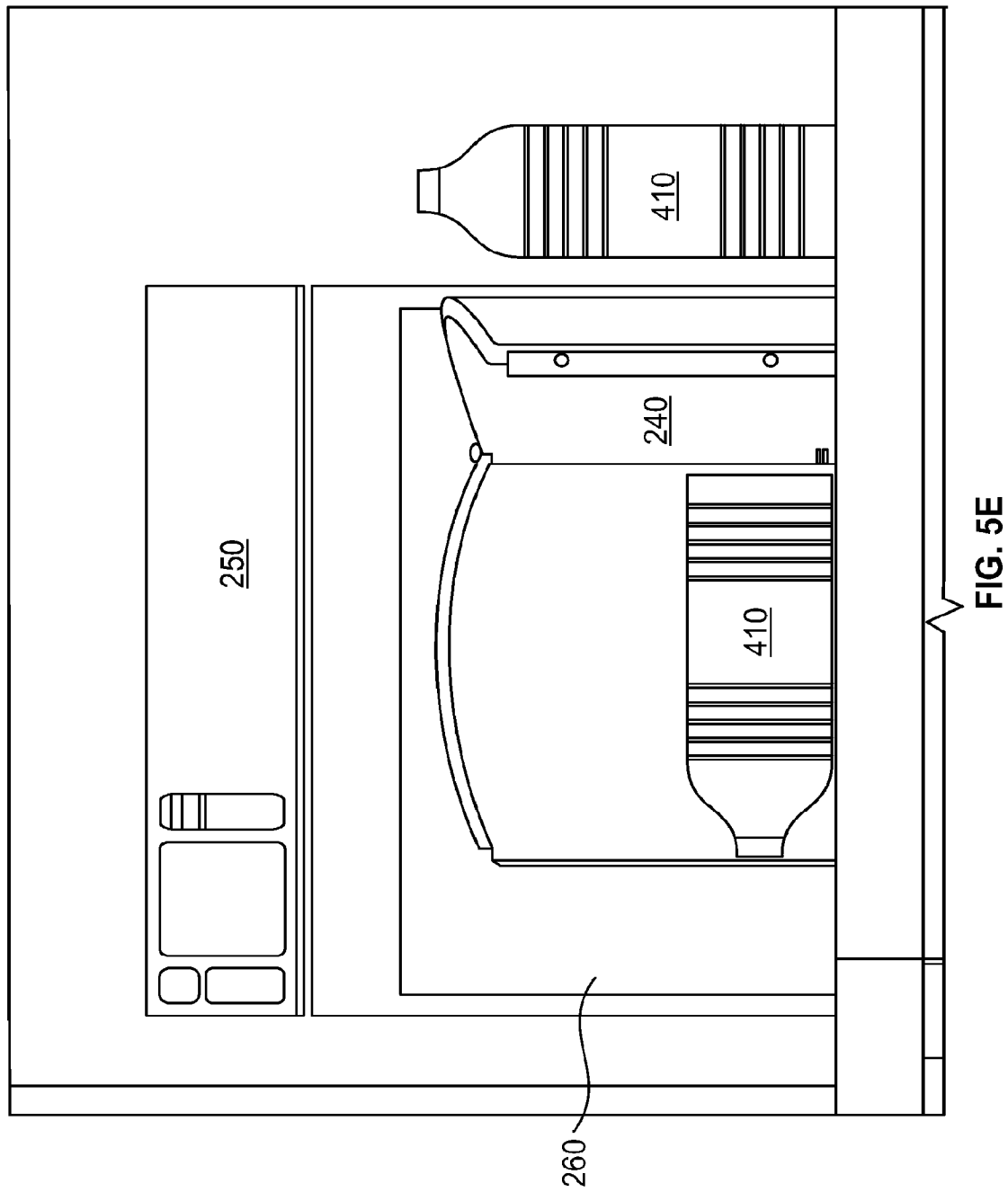

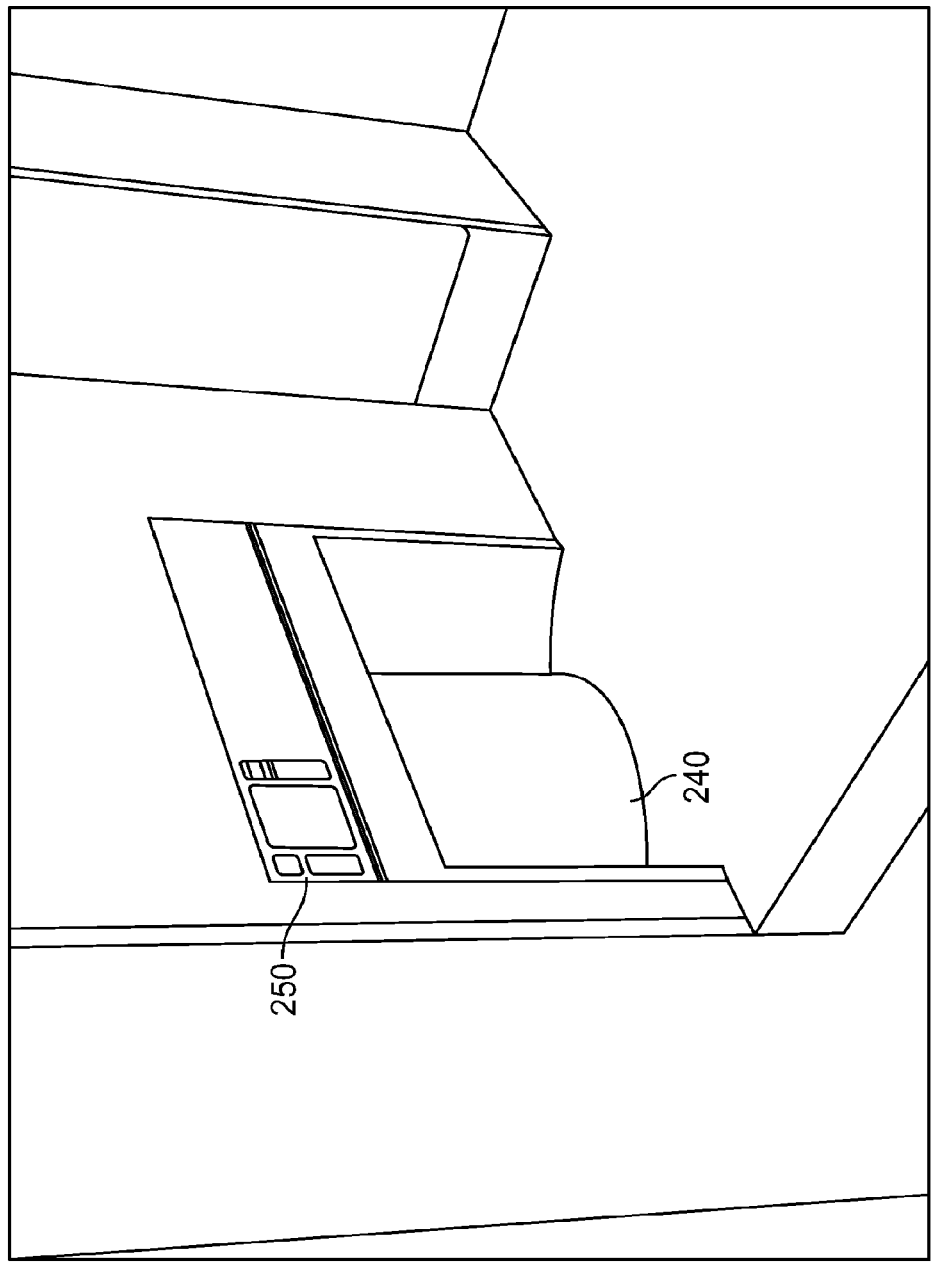

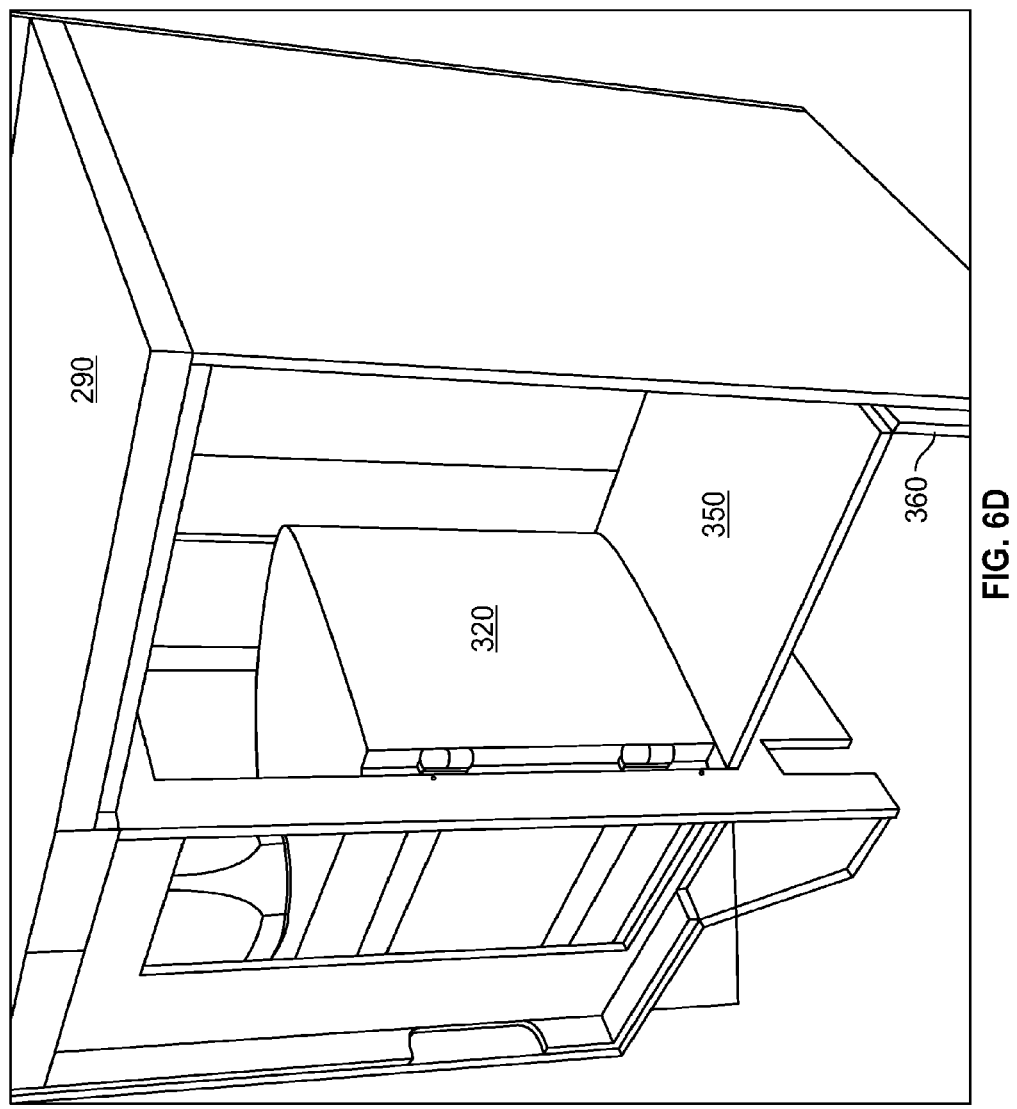

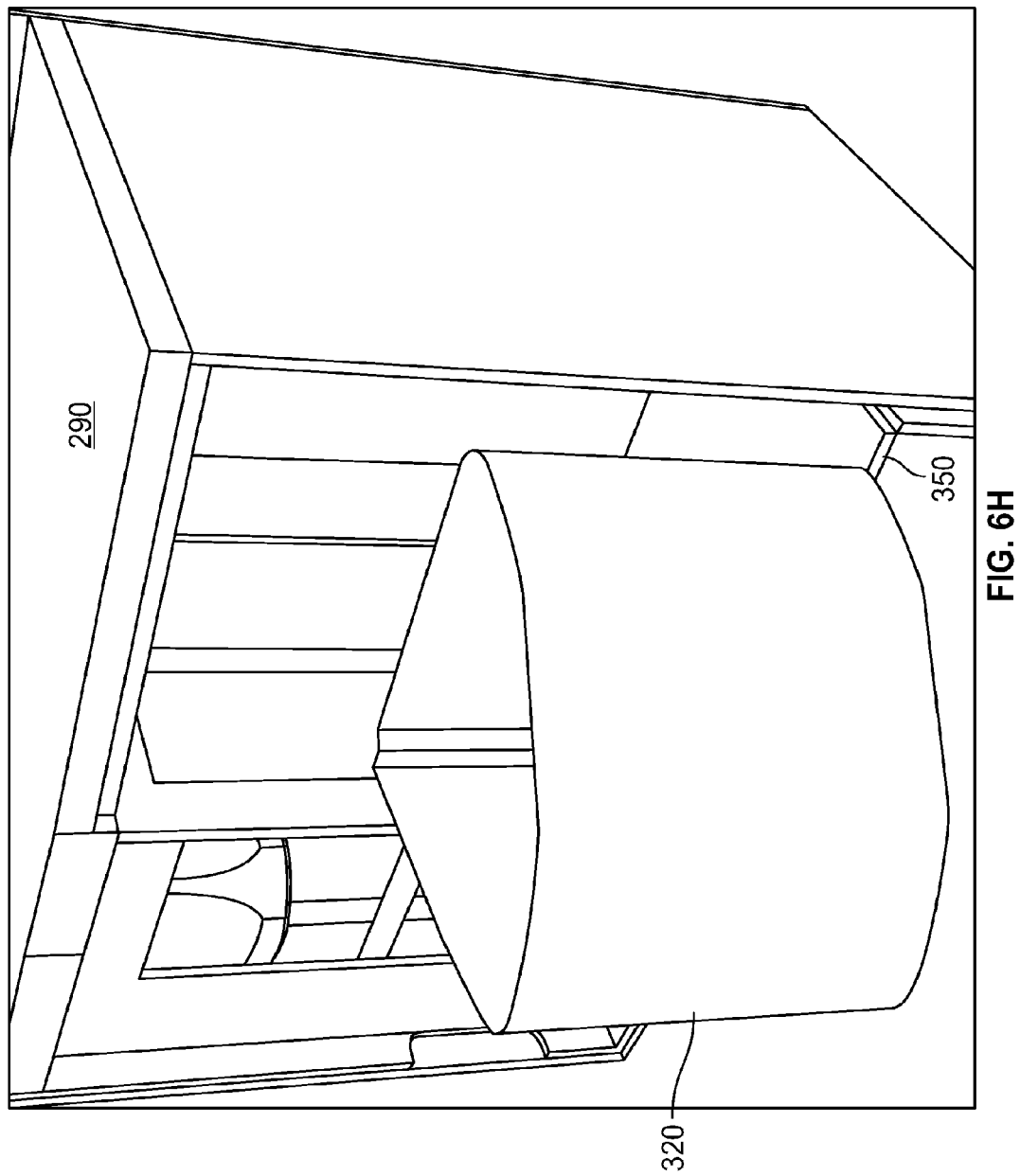

METHODS AND APPARATUS FOR COMPACTING TRASH

RELATED APPLICATION

This application claims priority to U.S. Provisional Patent Application No. 61/385,291, entitled "Apparatus and Method For Compacting Trash," and filed on Sep. 22, 2010, the entirety of which is hereby incorporated by reference.

FIELD OF THE DISCLOSURE

This disclosure relates to methods and apparatus for compacting trash.

BACKGROUND

Conventionally, trash is compacted within a bin that is also used for collection of the compacted trash. Thus, trash is placed in the compaction bin, and a compaction cycle would compact the trash in the compaction bin. Placing trash into the compaction bin and compacting the trash may be repeated any number of times until the compaction bin becomes full. The compacted trash is then manually removed from the full compaction bin for disposal.

SUMMARY

Disclosed embodiments overcome problems of prior trash compactors to more efficiently compact trash, make removal of compacted trash simpler and more effortless, and to free up space that would otherwise be occupied by prior trash compactors.

Removing the compacted trash from a conventional compaction bin may be very difficult or cumbersome for several reasons. The compaction bin may not be located in a convenient location, so accessing the compaction bin to remove the compacted trash may be difficult. In addition, the compacted trash may be very dense and heavy, making lifting the compacted trash out of the compaction bin difficult. Furthermore, the compacted trash may be tightly packed into the compaction bin such that the compaction bin tends to hold the compacted trash in place by a combination of friction and pressure between the compacted trash and the side walls of the compaction bin. As a result, a user attempting to empty the compaction bin may find lifting the compacted trash out of the compaction bin difficult.

Additionally, because of the combination of the friction and pressure making removal of the compacted trash difficult, conventional trash liners may easily tear if used in the conventional trash compactor. Consequently, a heavy duty trash liner having a high tensile strength capable of withstanding extraordinary forces may be required. These heavy duty trash liners may be significantly more expensive than the conventional trash liners.

Another problem with prior apparatuses for compacting trash relates to how their cost and efficiency scale with capacity. If a larger capacity is desired in order to reduce the frequency with which the trash compactor must be emptied, the compaction bin may need to be made larger. Consequently, associated mechanical equipment that compacts the trash in the compaction bin, such as the compaction actuator, must also be made larger. These enlargements increase the weight and cost of the trash compactor. Furthermore, these enlargements would result in a larger and heavier quantity of compacted trash that needs to be removed from the trash compactor. Thus, the problems related to pressure and frictional forces between the compacted trash and the sides of the compaction bin increase as the capacity of the trash compactor is increased.

To overcome at least these problems, trash compactors and trash compacting methods are disclosed that compact trash into relatively small discs of compacted trash that are easily removable from a compaction bin. In various embodiments, trash is compacted for a small number of cycles (e.g., two or three cycles), before the compacted trash is removed from the compaction bin. Because the compacted trash is significantly smaller than the interior of the compaction bin, there is a lack of significant pressure or frictional forces that may make removal of the compacted trash from the compaction bin difficult. For example, the compacted trash may be in a disc, coin, puck or platter-like shape that has a small side surface area that contacts the interior sides of the compaction bin. Due to this small surface area of contact, the compacted trash can be easily and automatically removed from the compaction bin and placed in a collection bin prior for subsequent disposal.

Embodiments may further reduce the pressure and frictional forces due to the compacted trash contacting the interior walls of the compaction bin by using a cylindrical compaction bin. For instance, a cylindrical compaction bin, which has a circular cross section, is advantageous over conventional compaction bins that have rectangular cross sections because there are no corners in which compacted trash may become wedged or stuck. Additionally, a cylinder has a smaller side surface area per unit volume than other containers that have square, rectangular, triangular, or other polygonal cross sections, thereby reducing pressure and frictional forces between side surfaces of the compacted trash that contact the interior sidewalls of the compaction bin. A circular disc of compacted trash having a given unit volume of compacted trash has less surface area contacting sidewalls of a cylindrical compaction bin than a rectangular brick of compacted trash having the same unit volume and a same top or bottom surface area in a comparable compaction bin having a rectangular cross section.

Embodiments may also further reduce the surface area of the compacted trash that contacts the interior of the compaction bin by compacting the trash into a disc such that more of the compacted trash is toward the center of the disc. In other words, the disc need not have a flat profile. In addition to improving load balance, a center-weighted disc of compacted trash has a smaller side surface area, and thus is more easily removed from the compaction bin. This is because a center-weighted disc of compacted trash has less side surface area than an evenly distributed disc having the same volume of compacted trash.

In order to conveniently continue trash compaction operations without requiring an operator to intervene and empty the compaction bin when full, the disclosed methods and apparatus for compacting trash periodically or aperiodically eject the compacted trash from the compaction bin into a separate collection bin for storage and subsequent disposal. The collection bin may be as large as desired for collection and storage of compacted trash without requiring that the compaction bin and associated mechanical equipment (e.g., a compaction actuator) be made larger. In this way, the disclosed embodiments may efficiently compact a large amount of trash without being manually emptied by an operator. And furthermore, since the compacted trash is loosely collected into a separate collection bin, the compacted trash may be easily removed from the collection bin for disposal. An inexpensive standard strength trash bin liner may be used in the collection bin for this purpose, rather than an expensive high tensile-strength heavy-duty compaction bin liner of prior apparatuses for compacting trash.

In an embodiment, the disclosed embodiments may be incorporated into a vehicle integrated galley trash compactor (IGTC) used to compact trash accumulated during travel, for example, trash remaining in an airplane flight from in-flight meal, snack and beverage services, carried on board by passengers, etc. The IGTC may be integrated into a vehicle to reduce weight, cost, and occupied space, and increase efficiency.

A disclosed example trash compaction system includes a trash receptacle, a collection bin, a compaction bin proximal to the collection bin, having a receiving opening to receive trash via the trash receptacle, and having an ejection opening through which compacted trash is ejected into the collection bin, and a compactor mechanism operatively coupled with the compaction bin to compact the trash within the compaction bin.

Another disclosed example trash compaction system includes a trash receptacle, a closeable trash door disposed to provide access to the trash receptacle, a compaction bin disposed below the trash receptacle that receives trash therefrom, and having a closeable opening at a bottom end through which compacted trash is ejected, a compactor mechanism operatively coupled with the compaction bin to compact the trash within the compaction bin, and a collection bin disposed below the compaction bin that receives the compacted trash ejected from the compaction bin.

A disclosed example trash compaction method includes collecting trash in a compaction bin having a selectively closeable opening at a bottom end, compacting the trash in the compaction bin, opening the selectively closeable opening, and ejecting the compacted trash from the compaction bin into a collection bin via the selectively closeable opening.

BRIEF DESCRIPTION OF THE DRAWINGS

Features and advantages will become apparent by describing in detail exemplary embodiments with reference to the attached drawings in which:

FIGS. 4A-4D are exemplary illustrations of the IGTC of FIGS. 3A and 3B, showing major components thereof;

FIGS. 6A-6I illustrate exemplary operations of the IGTC of FIGS. 3A-5S in removing compacted trash.

DETAILED DESCRIPTION

While the exemplary embodiments described herein are presented in the context of an IGTC disposed in an aircraft galley, these embodiments are exemplary only and are not to be considered limiting. For example, embodiments of the apparatus for compacting trash may be used in any vehicle, including an aircraft, a spacecraft, a ship, a bus, a train, a recreational vehicle, a truck, an automobile, a boat, and the like. The disclosed embodiments may also be used in homes, offices, hotels, factories, warehouses, garages, and other buildings where it may be desirable to efficiently compact trash. In general, the disclosed embodiments may be used at any location or application in which efficient trash compaction is desired.

Figure 1:
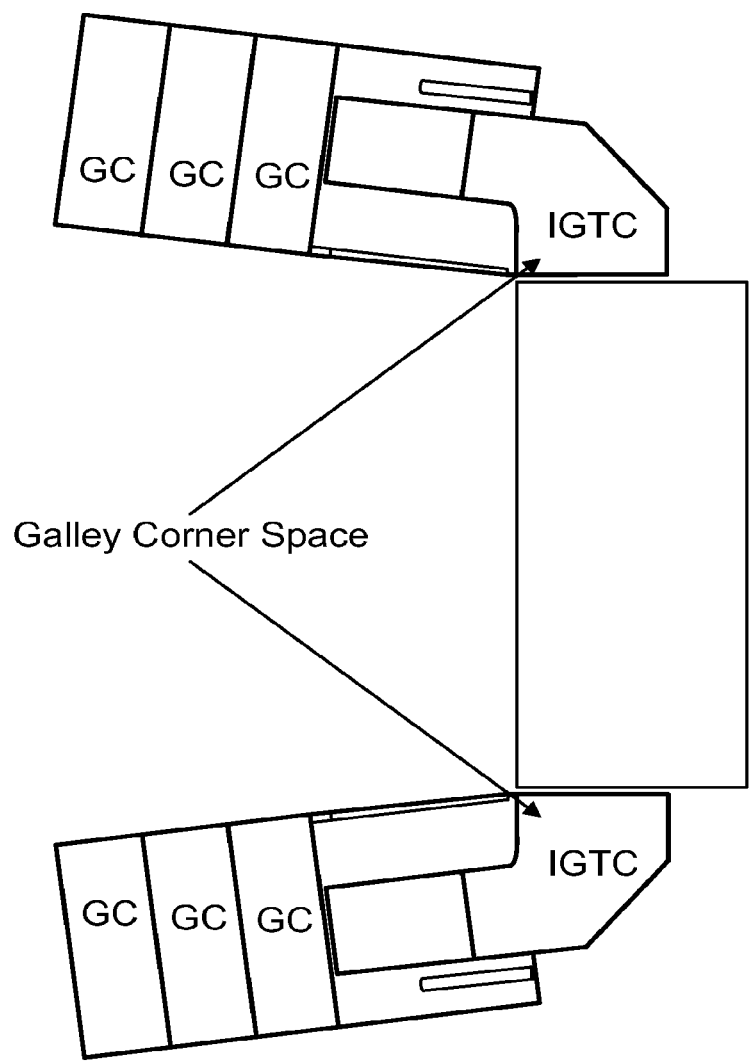
FIG. 1 is a top view of an exemplary galley layout.

An IGTC is a highly-efficient space-efficient galley-mounted built-in trash compaction system designed to fit into rear corners of a medium to large-size aircraft galley, as depicted in FIG. 1 as "Galley Corner Space." Using an IGTC, previously unused galley space (e.g., so-called "dead corner space") can be utilized, thereby freeing up additional galley cart space (e.g., identified as GC in FIG. 1) that can be used for galley carts, and replacing traditional galley-cart style legacy trash compactors. The IGTC may be used to compact any and all aircraft trash normally accumulated during in-flight meal, snack and beverage services, carried on board by passengers and crew, etc. The use of an IGTC can free up as much as four standard trolley locations on an aircraft. The IGTC may be architected for simplicity in operation and use, thereby providing high reliability performance as another advantage.

Figure 2A:
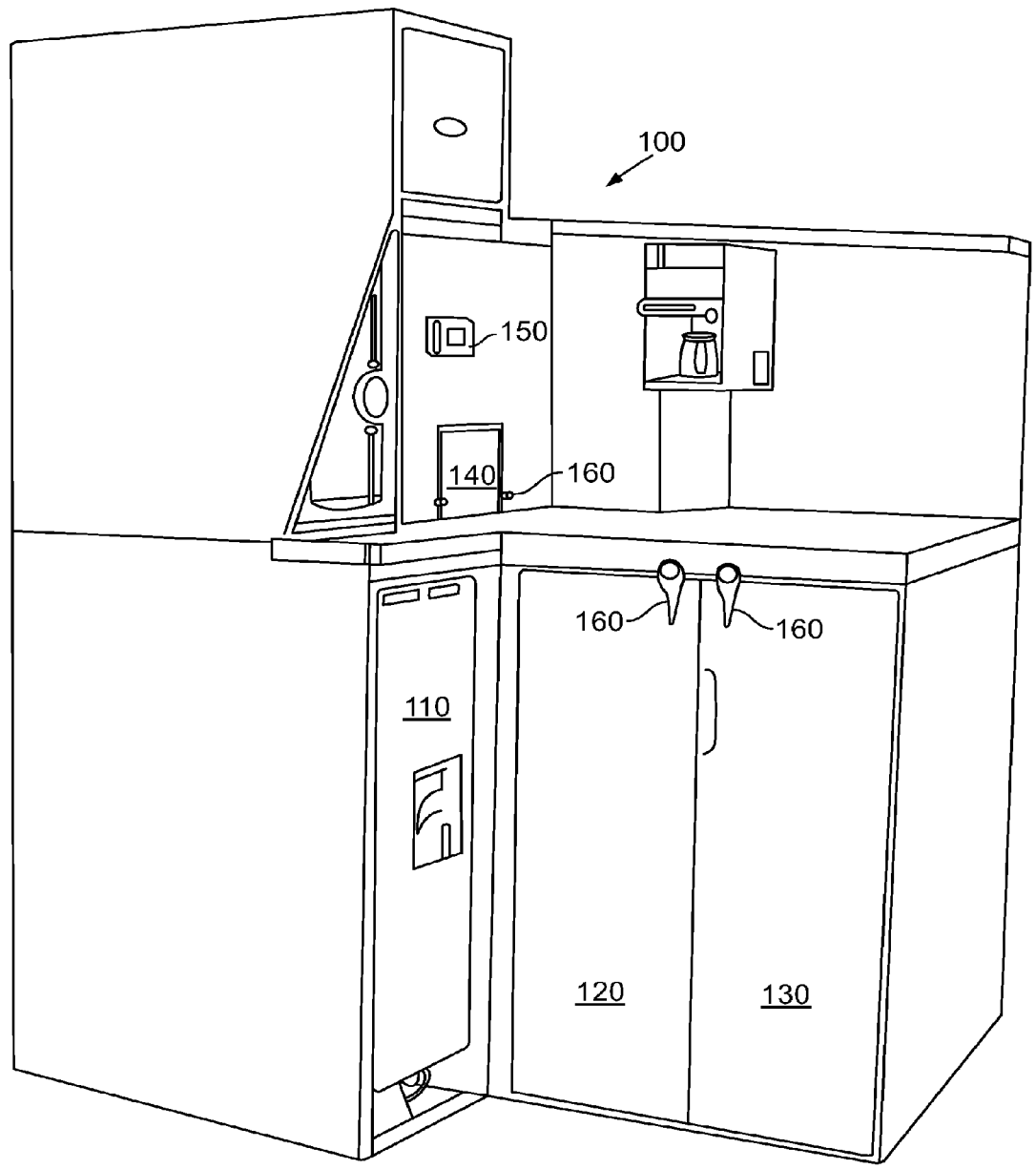
FIGS. 2A and 2B illustrate IGTC utilization of corner space of an exemplary galley layout.
Figure 2B:
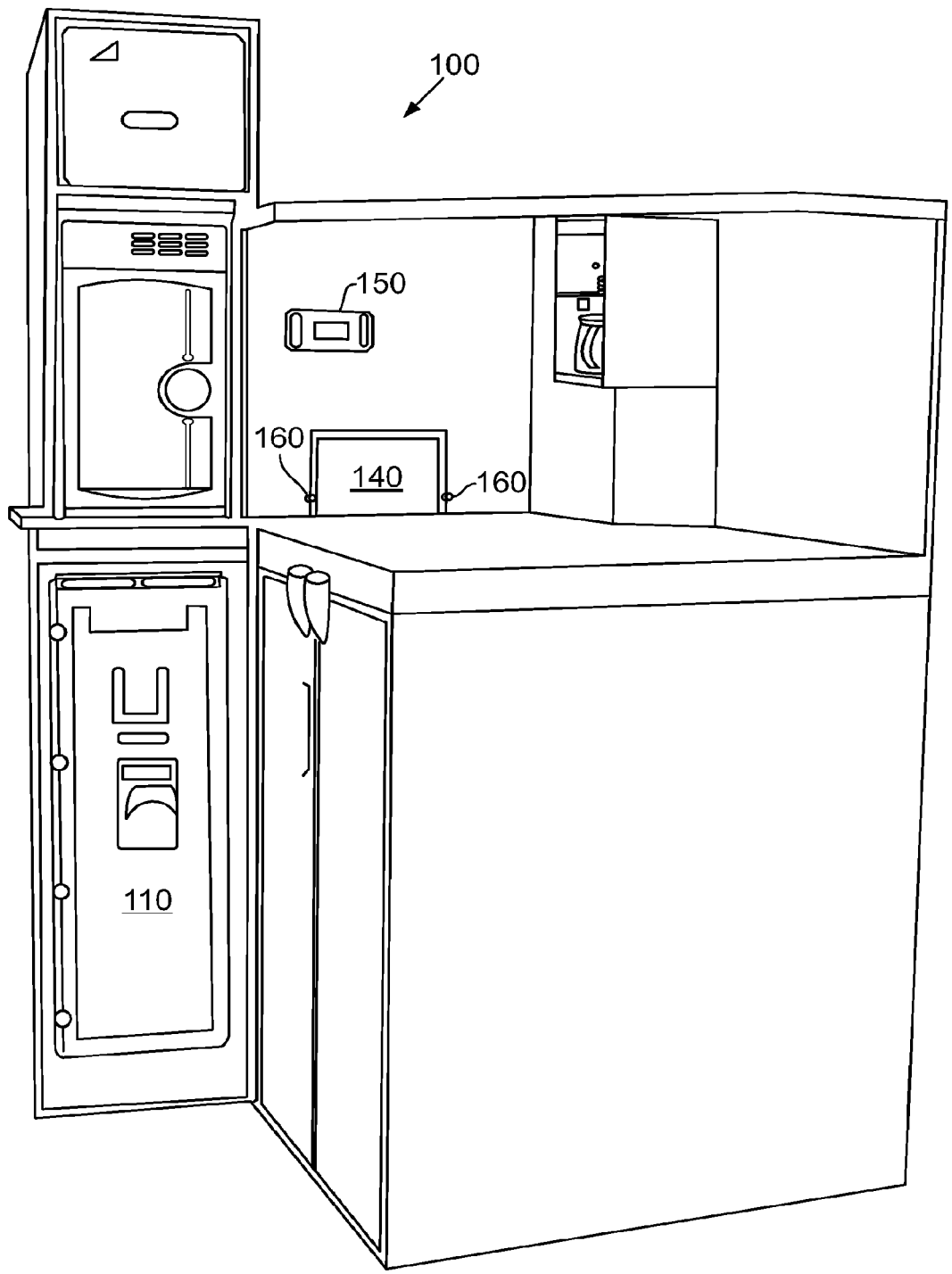

FIGS. 2A and 2B illustrate an IGTC implemented in the corner space of an exemplary galley corner 100. A trolley or galley cart 110 may be stored in a galley cart storage bay adjacent to the corner space below a counter. On an opposite side of the corner space, a left door 120 and a right door 130 may cover an open area that may be used for storage below a counter. In an alternative embodiment, the left door 120 and the right door 130 may be hinged together, form a single door, or be formed and arranged in other ways known to one of skill in the art. The doors 120 and 130 may be secured in a closed position by latches 160. In another alternative embodiment, additional galley carts may be stored in the space to the right of the corner space where doors 120 and 130 are illustrated in FIGS. 2A and 2B.

A trash door 140 may be installed in a wall panel covering the corner space above the counter and to the left of the doors 120 and 130. The trash door 140 opens to provide access to place trash into the IGTC. The trash door 140 may be secured closed by latches 160. A user interface panel (UIP) 150 that provides a cabin crew member with local control of the IGTC may be installed on the wall above the trash door 140. Various trash compactor Line-Replaceable Unit (LRU) components of the IGTC may be installed behind the wall panel in which the trash door 140 and the UIP 150 are installed (e.g., see FIG. 7). Many of the LRU's are above-counter level, especially an actuator, which will increase capacity and provide better access to place trash into a compaction bin of the IGTC via direct access to a trash receptacle behind the trash door 140 and above a top of a compaction bin. This access reduces trash jamming conditions that may occur inside of a trash chute behind the trash door 140 leading to the compaction bin in an alternative configuration.

Figure 3A:
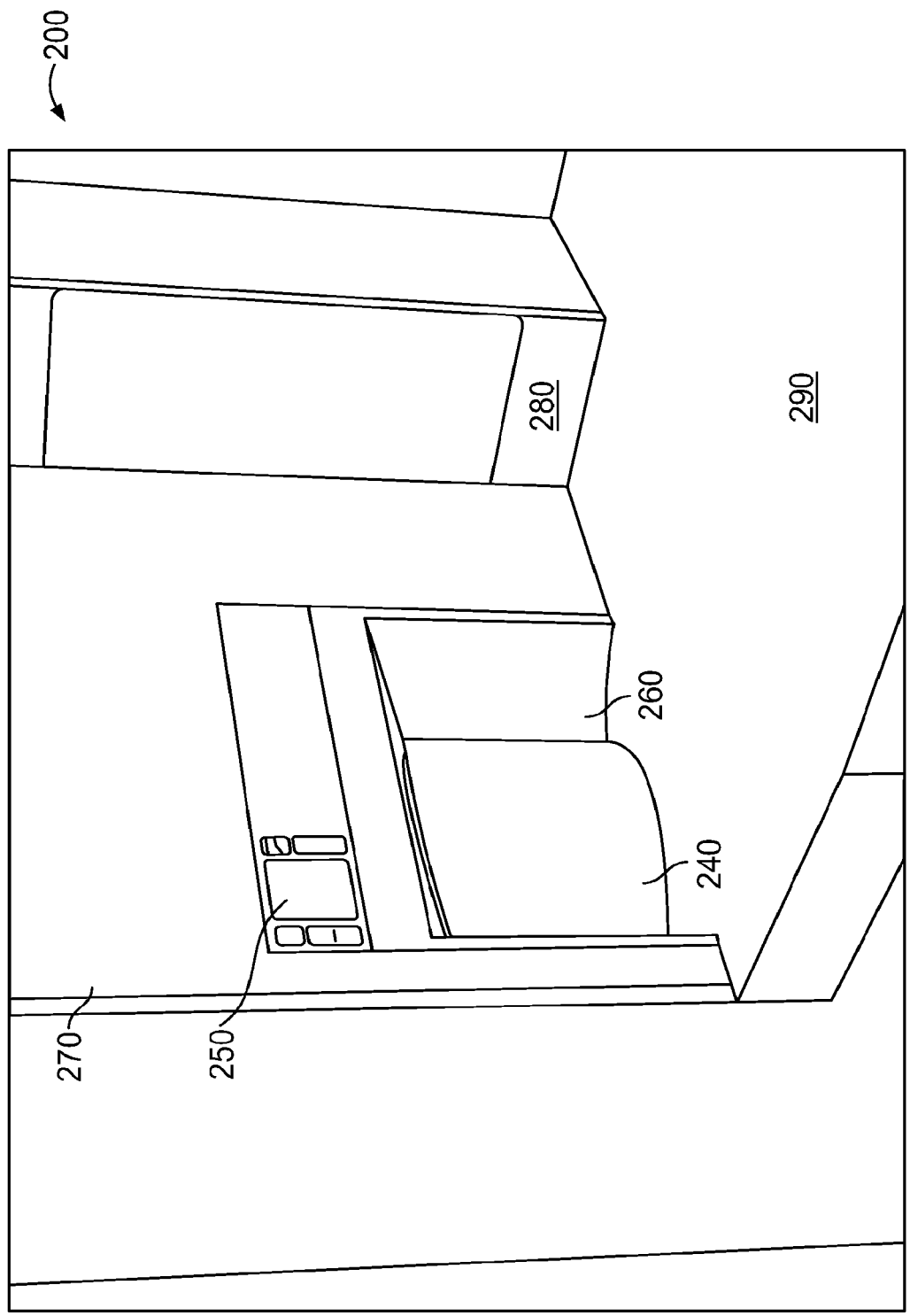
FIG. 3A is an exemplary illustration of a closed trash door and user interface panel for an IGTC in an exemplary galley corner.
Figure 3B:
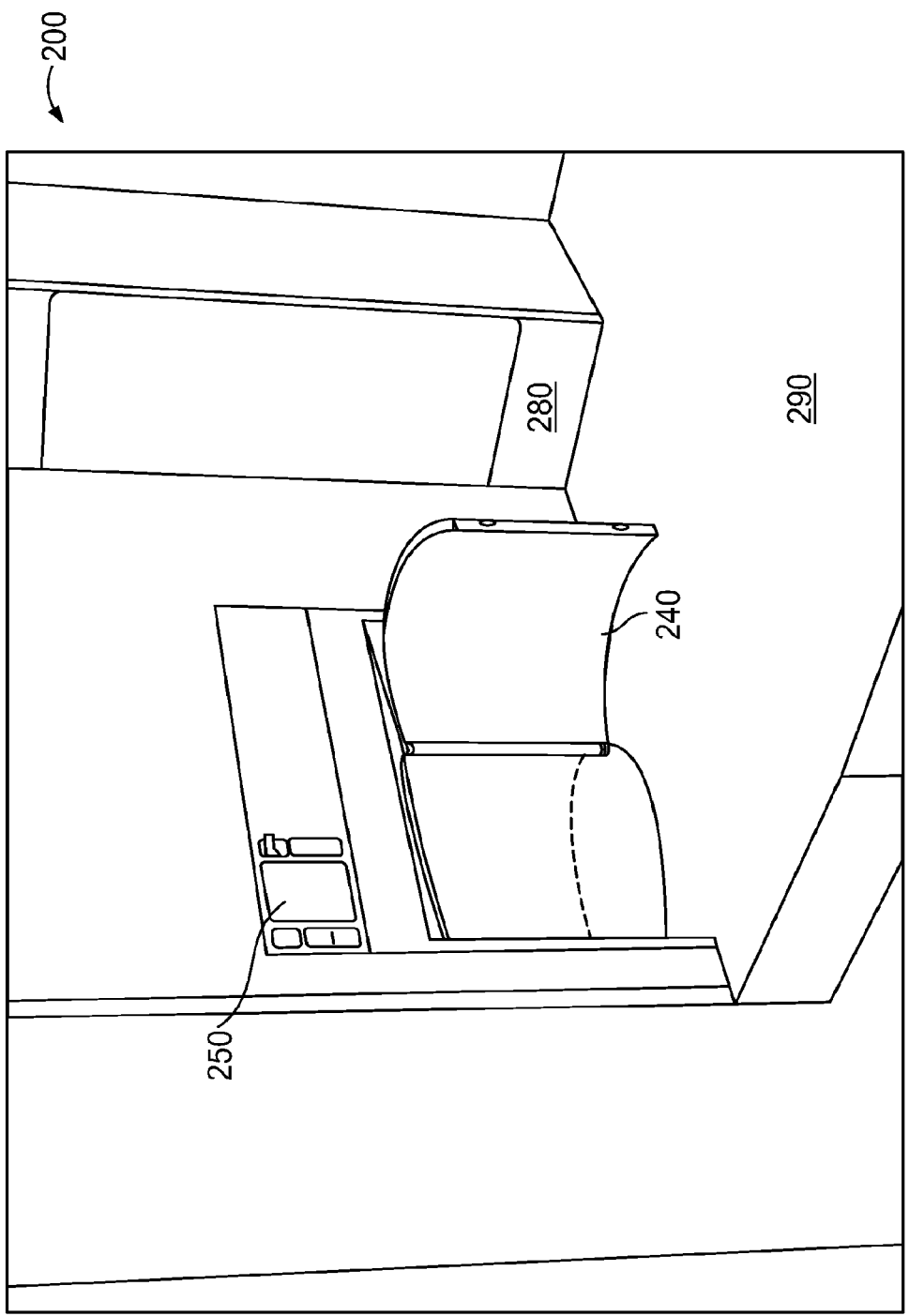
FIG. 3B is an exemplary illustration of an open trash door for the IGTC of FIG. 3A.

FIG. 3A is an exemplary illustration of a closed trash door 240 and UIP 250 for an IGTC in an exemplary galley corner 200. FIG. 3B is an exemplary illustration of the IGTC of FIG. 3A when the trash door 240 is open. As illustrated in FIG. 3A, the trash door 240 is installed in a recess 260 within a wall 270 above a counter 290. The trash door 240 may include a solenoid-activated latch and a door open sensor. The trash door 240 may provide enlarged access to facilitate easy insertion of trash into the IGTC, for example by single hand operation.

Figure 7:
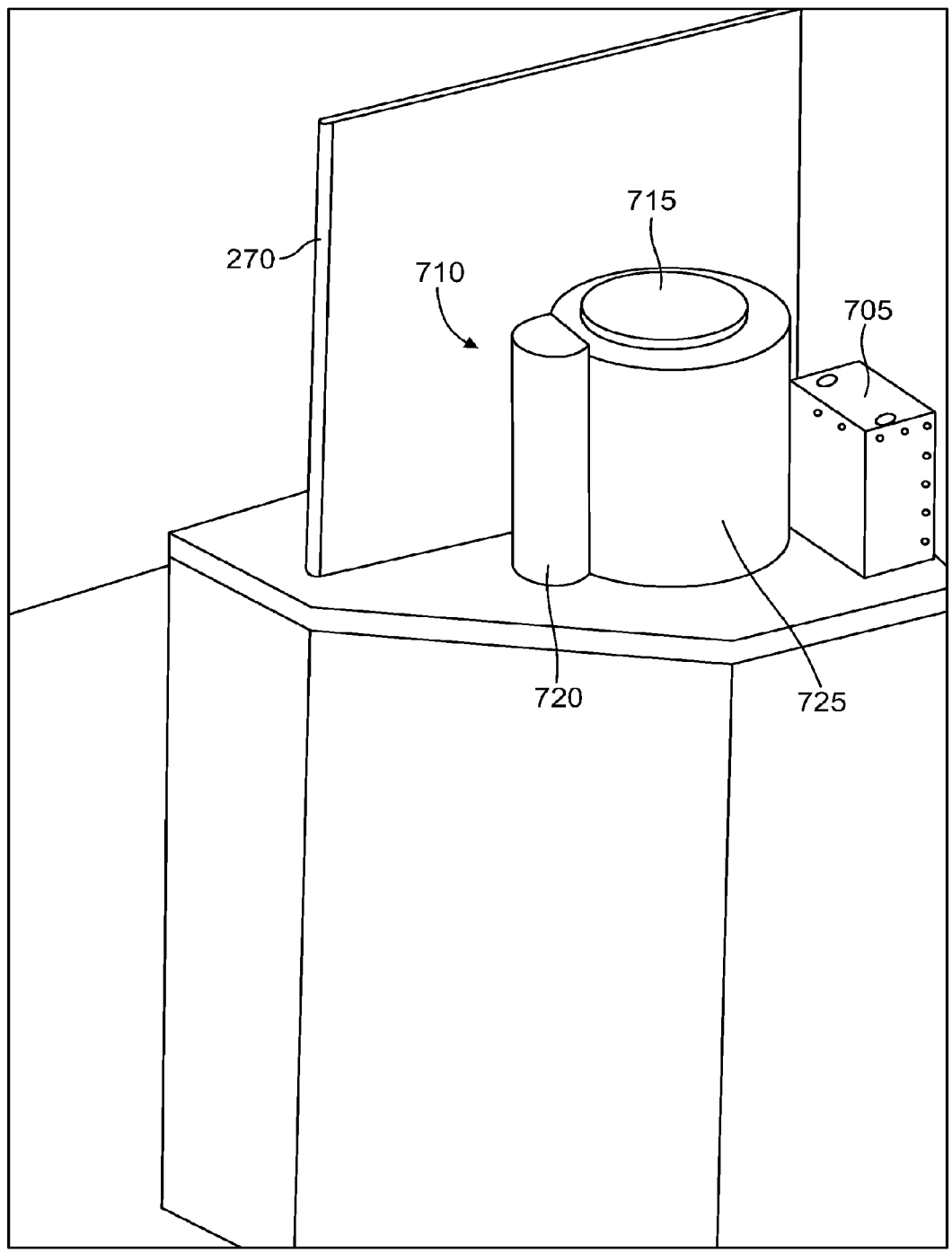
FIG. 7 illustrates exemplary hidden operational components of the IGTC disposed behind the wall panel above the level of the counter.

The LRU components of the IGTC may be installed behind the wall 270 having the recess 260 (e.g., see FIG. 7). The UIP 250 may be installed in the wall 270 above the recess 260. The UIP 250 may provide information as to the status of the IGTC, such as how many compaction cycles have been performed since the compacted trash was last collected, how much compacted and/or un-compacted trash is stored within the IGTC, and the like. The UIP 250 may also provide controls by which a cabin crew member may open the trash door 240, close the trash door 240, activate a trash compaction cycle, eject compacted trash into a collection bin, or perform other functions such as maintenance and tests. Operation of the IGTC via the UIP 250 may be simple, intuitive and harmonize with operation of other systems onboard the aircraft.

The trash door 240 may be curved and hinged on one side so that it may open to the side and swing toward a back wall 280 of the galley corner 200. One or both of the side walls of the recess 260 may be tapered from a wide opening essentially flush with the wall 270 to a narrower opening behind the trash door 240 that leads to the trash receptacle. By being tapered in this manner, the trash door 240 may swing out of the way for easy insertion of trash into the trash receptacle as illustrated in FIG. 3B. The taper may help a cabin crew member to smoothly and easily insert trash into the IGTC without the trash becoming caught by or stuck in the opening at the trash door 240. For example, the combination of the trash door 240 and the recess 260 may accommodate full garbage bags of standard size used in commercial aircraft to be easily inserted into the IGTC.

FIGS. 4A-4D are exemplary illustrations of the IGTC of FIGS. 3A and 3B, showing major components thereof. The components of the IGTC illustrated in FIGS. 4A-4D are disposed below a level of the counter 290 of the galley corner 200. A compaction bin 310 is disposed in the corner below the trash receptacle. The compaction bin 310 may include a load sensor, a weight sensor, and a structural fail-safe sensor.

The compaction bin design is preferably cylindrical, which allows for much higher compacting pressures than that of a conventional rectangular box design. In fact, the compaction pressure for most in-flight trash can be ten times higher in the IGTC than that of conventional trash compactors. This results in four times more compaction efficiency, when measured against the volume of uncompressed-to-compressed material ratios.

Trash inserted through the opening behind the trash door 240 of FIGS. 3A and 3B is deposited in the compaction bin 310. Below the compaction bin 310 is a collection bin 320. The collection bin 320 collects the compacted trash after being compacted in the compaction bin 310 and ejected from the compaction bin 310. The collection bin 320 may be lined with a disposable trash bag of standard strength that may be simply removed from the collection bin 320 in a manner similar to that of a conventional trash bag in a conventional trash can. The collection bin 320 may be large such that all trash on a typical long-duration transoceanic flight may be collected without emptying the collection bin 320 during flight.

Access door panels 350 and 360 are disposed in a partition 370 to the right of the compaction bin 310 and collection bin 320. When the door panels 350 and 360 are in a closed position, the compaction bin 310 and collection bin 320 are hidden from view. The door panels 350 and 360 may be hinged together such that the door panel 360 may be opened first by tilting the door panel 360 outward and downward. The door panel 350 may also be hinged at its bottom so that the door panel 350 may also tilt outward and downward.

Figure 4A:
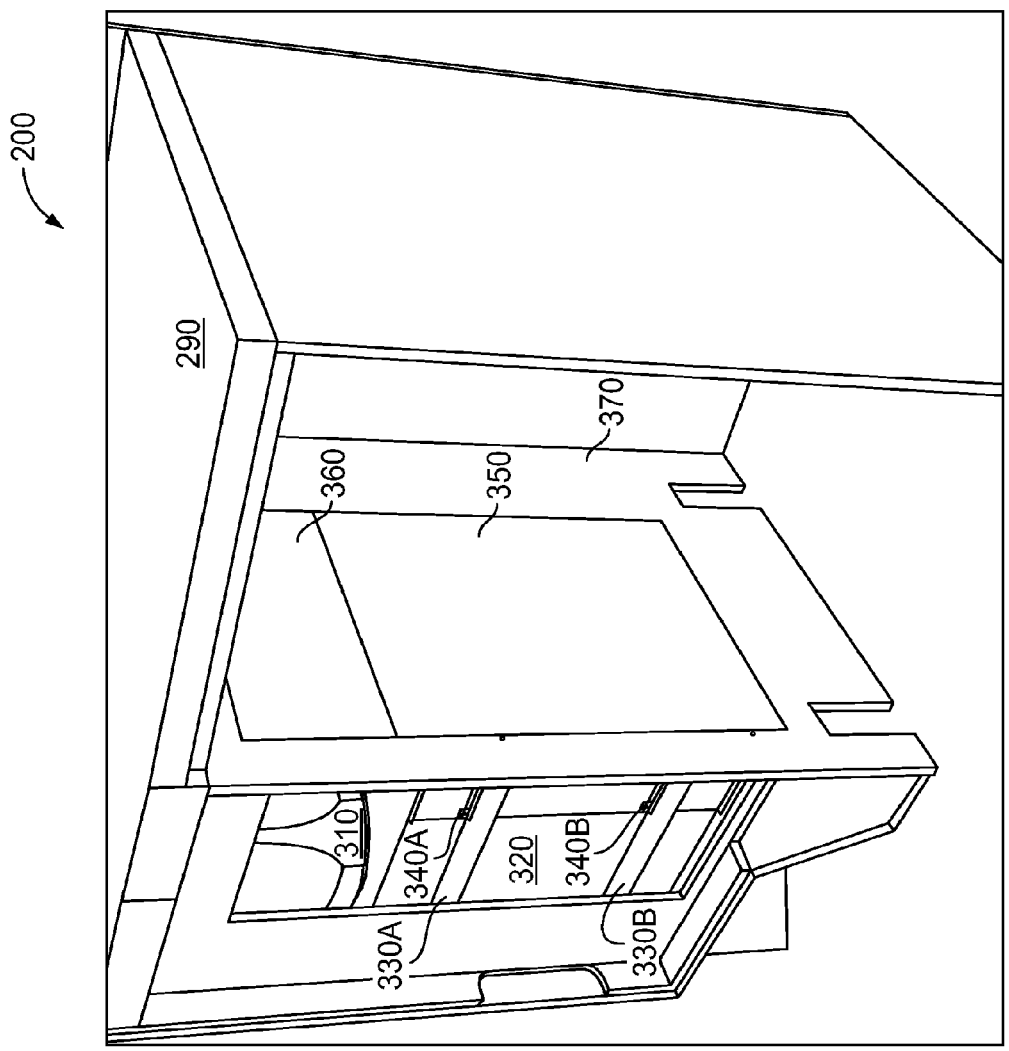
Figure 4B:
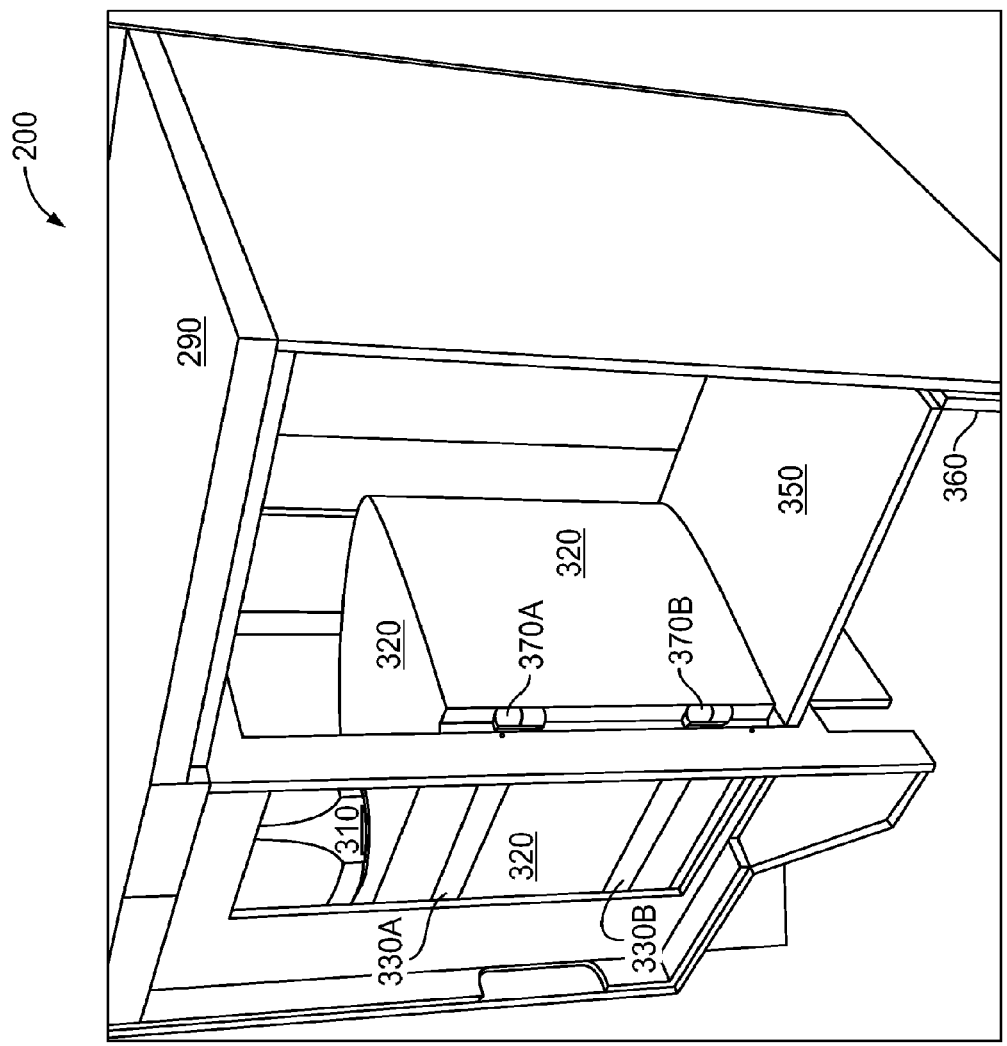
Figure 4D:
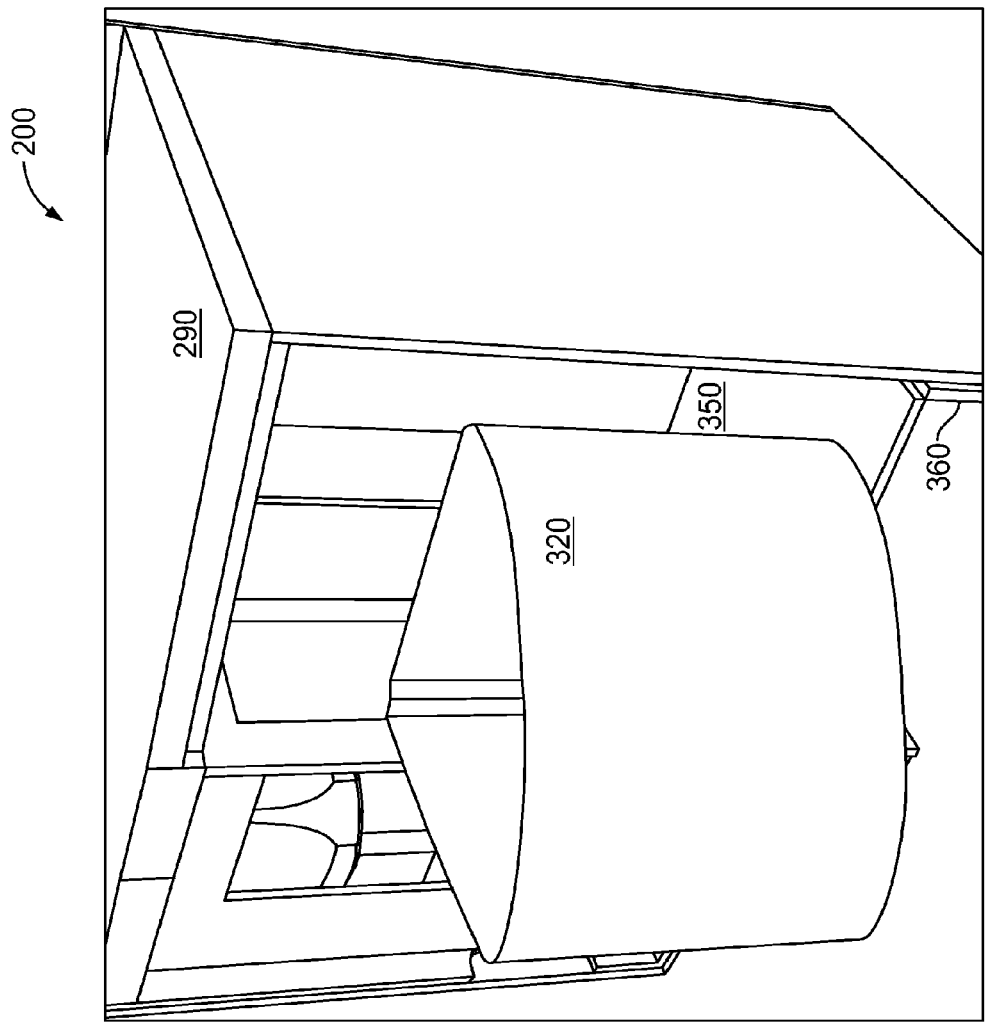

The access door panels 350 and 360 may fold down such that door panel 360 provides support for door panel 350 to rest in a flat and level horizontal position adjacent to the opening providing access to the collection bin 320. When the door panels 350 and 360 are in an open position as illustrated in FIG. 4B, the collection bin 320 may slide out from under the compaction bin 310 along rails 330A and 330B using rail gliders 340A and 340B, respectively. The collection bin 320 may then slide toward or onto a top surface of the horizontally disposed open access door panel 350 without obstruction and without being raised or lowered. The level of the top surface of the horizontally disposed open access door panel 350 may be approximately equal to a level of a bottom surface of the collection bin 320 before the collection bin 320 is slid out from under the compaction bin 310.

After the collection bin 320 is slid toward the top surface of the access door panel 350 along the rails 330A and 330B, hinges 370A and 370B may extend from the access opening in the partition 370. As illustrated in FIG. 4C, the collection bin 320 may then rotate outward about the hinges 370A and 370B such that the collection bin 320 moves over or rests on the top surface of the horizontally disposed open access door panel 350. The collection bin 320 may then be further rotated about the hinges 370A and 370B such that the collection bin 320 extends beyond the top surface of the horizontally disposed open access door panel 350 and the counter 290 of the galley corner 200 for easy access. In the position illustrated in FIG. 4D, the trash collected in the collection bin 320 may be easily extracted by a cabin crew member and aircraft service/maintenance personnel by simply lifting out a trash bag. Because the trash is not compacted within the collection bin 320, but rather only collected in the collection bin 320 after being compacted in the compaction bin 310, the compacted trash in the collection bin 320 may be as easily removed from the collection bin 320 as non-compacted trash from a conventional trash bin.

Figure 5B:
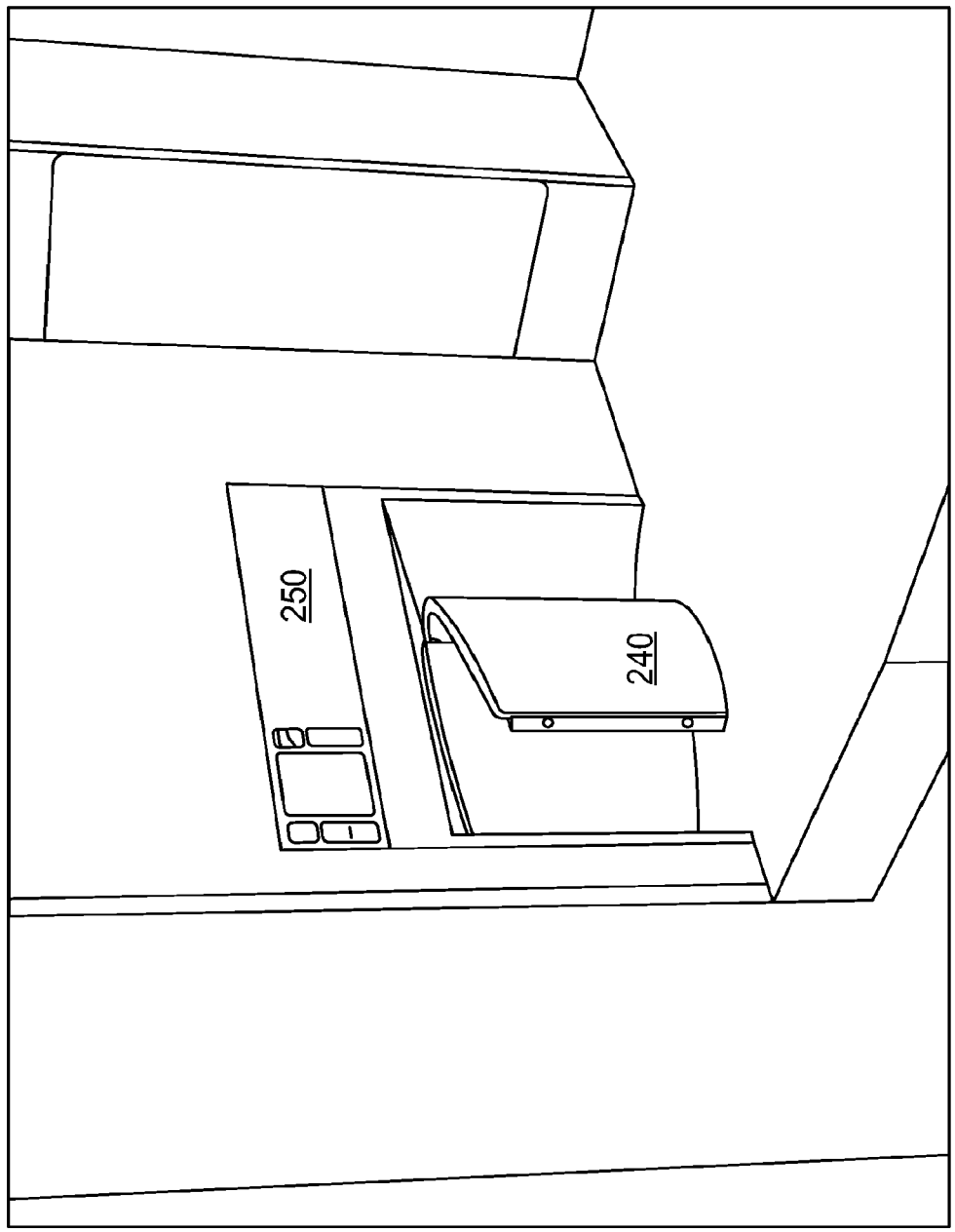
FIGS. 5A-5S illustrate exemplary operations of the IGTC of FIGS. 3A-4D in compacting trash.
Figure 5C:
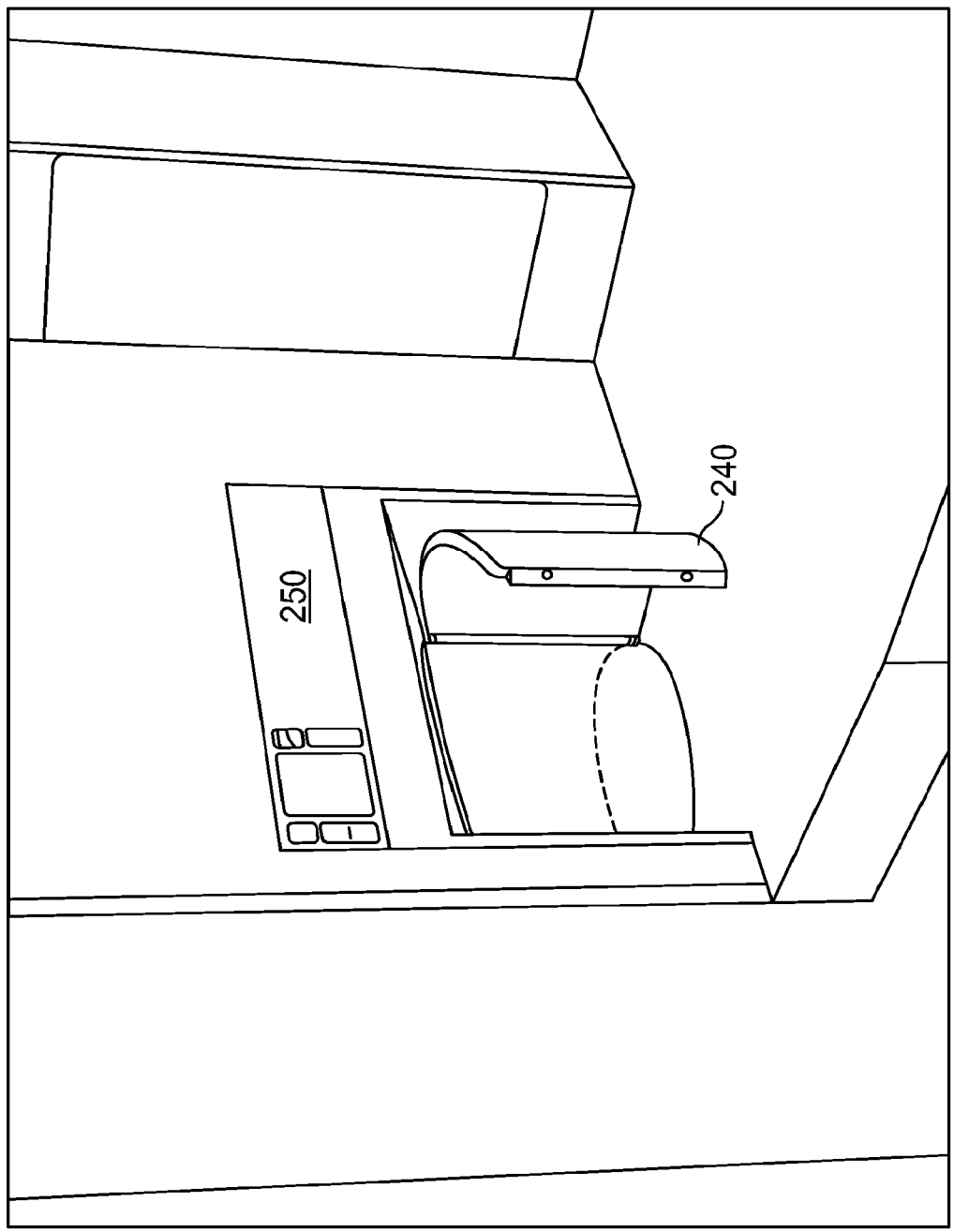
Figure 5D:
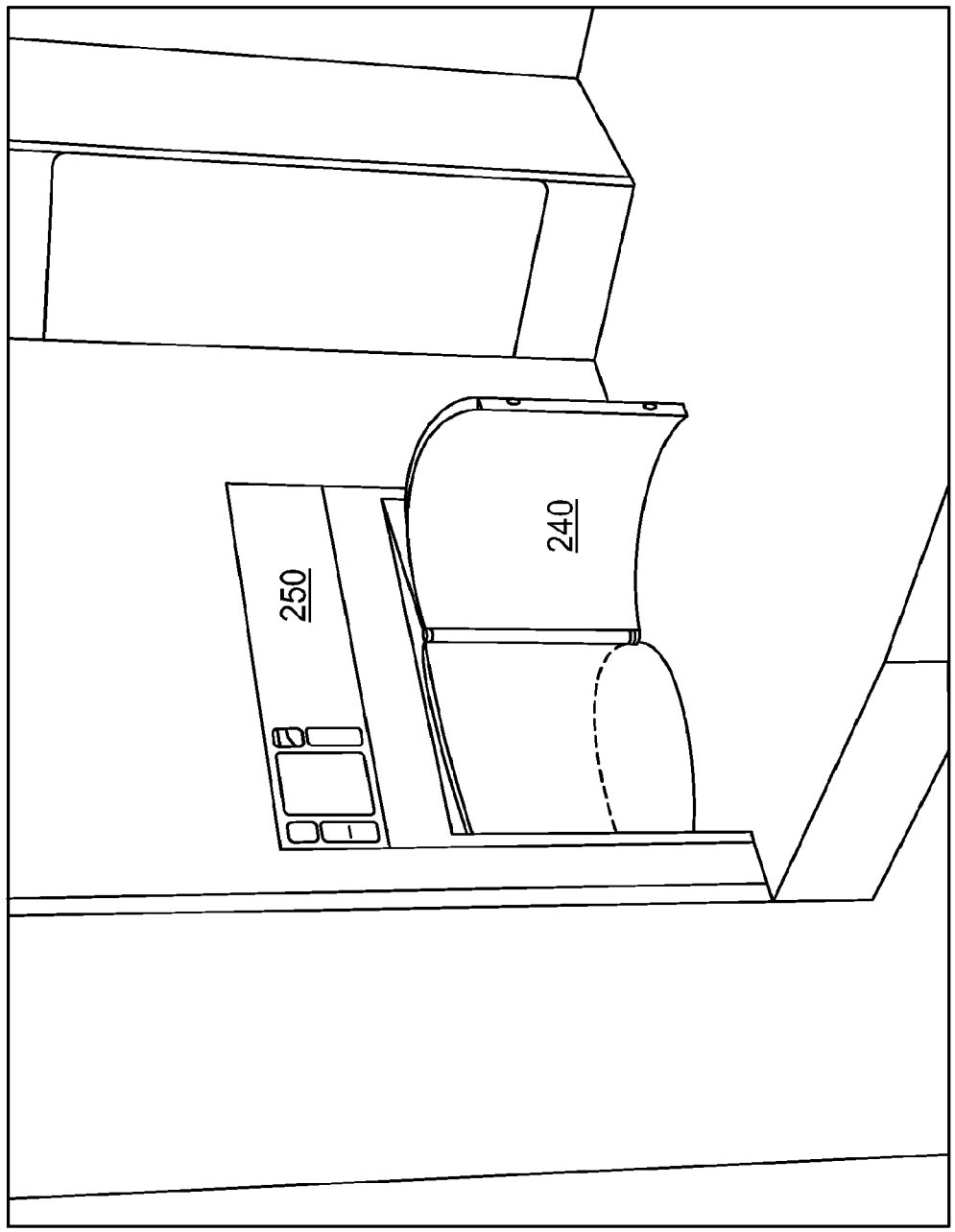
Figure 5F:
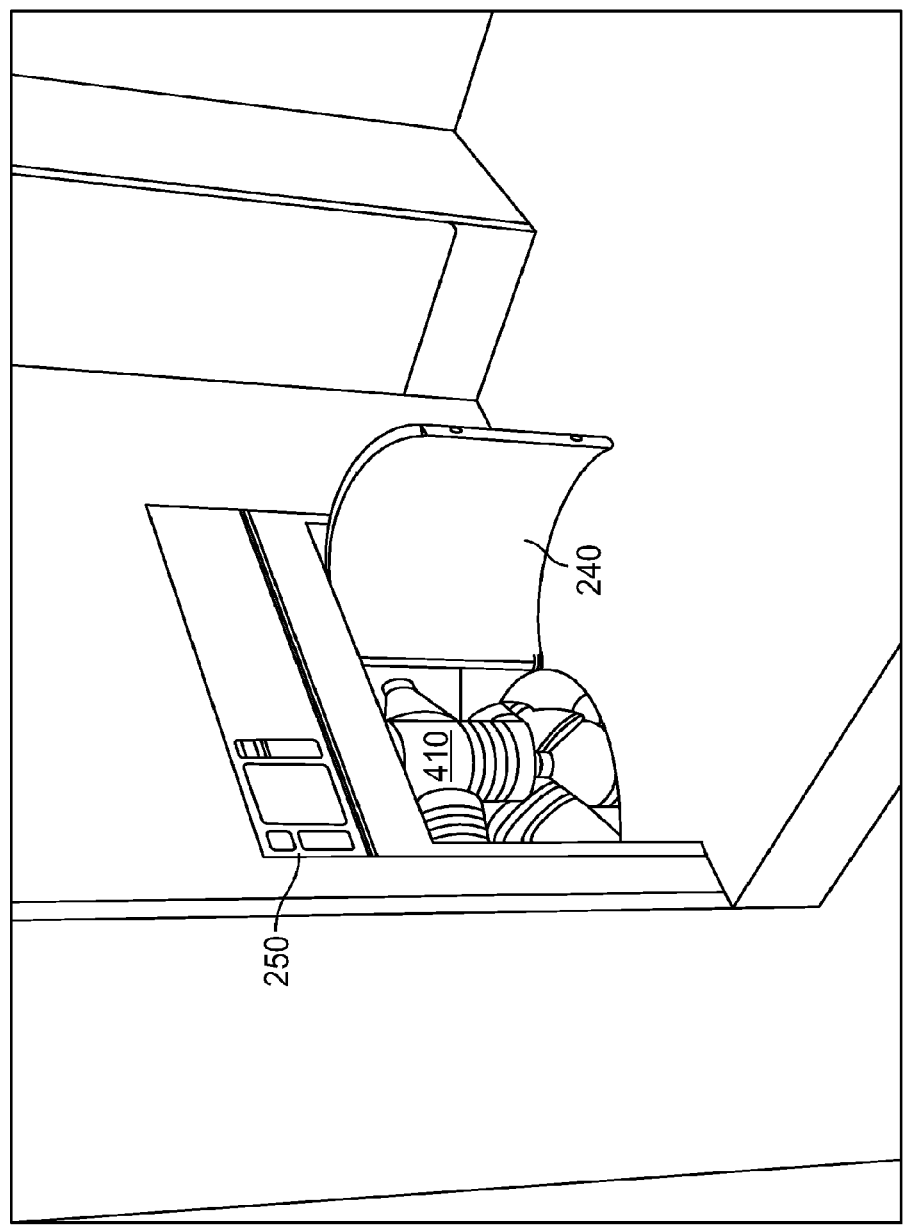
Figure 5H:
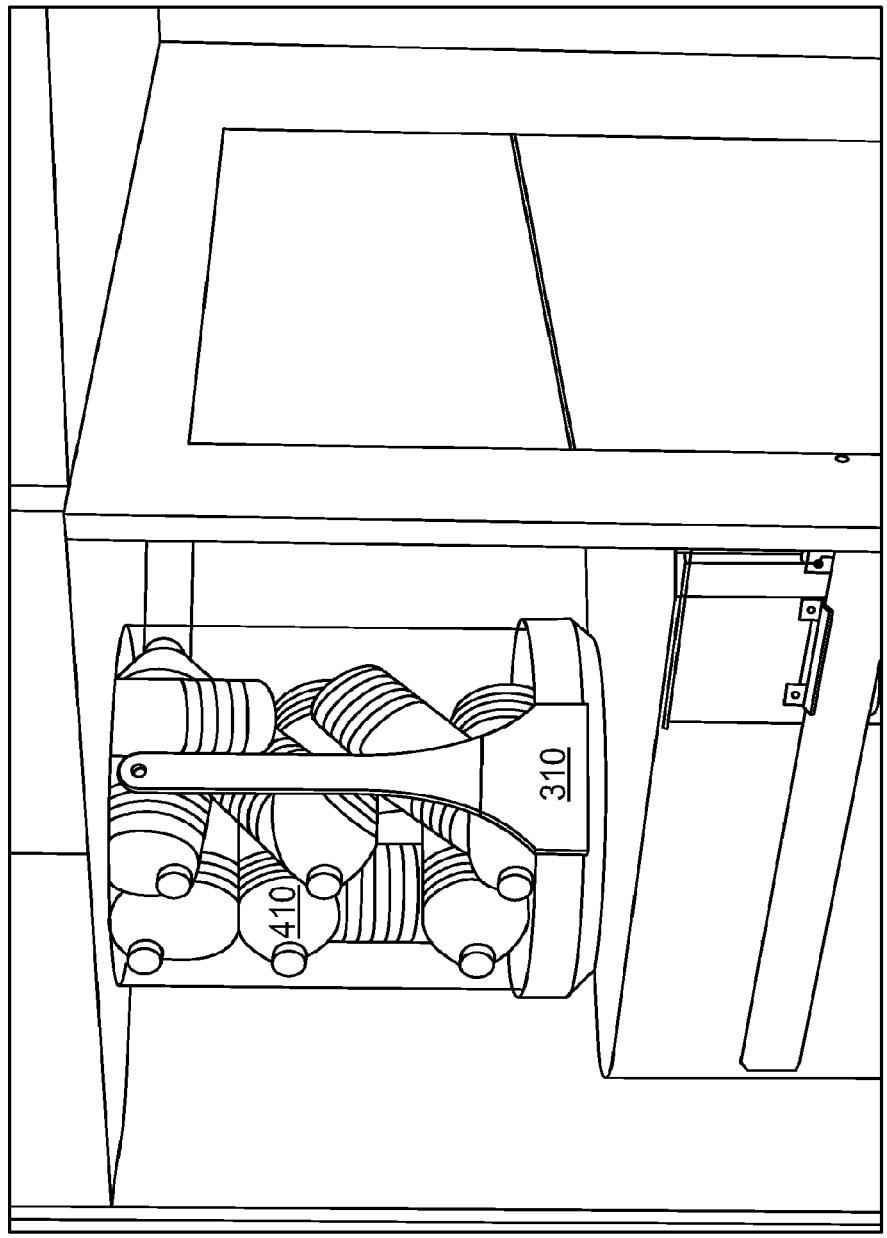
Figure 5I:
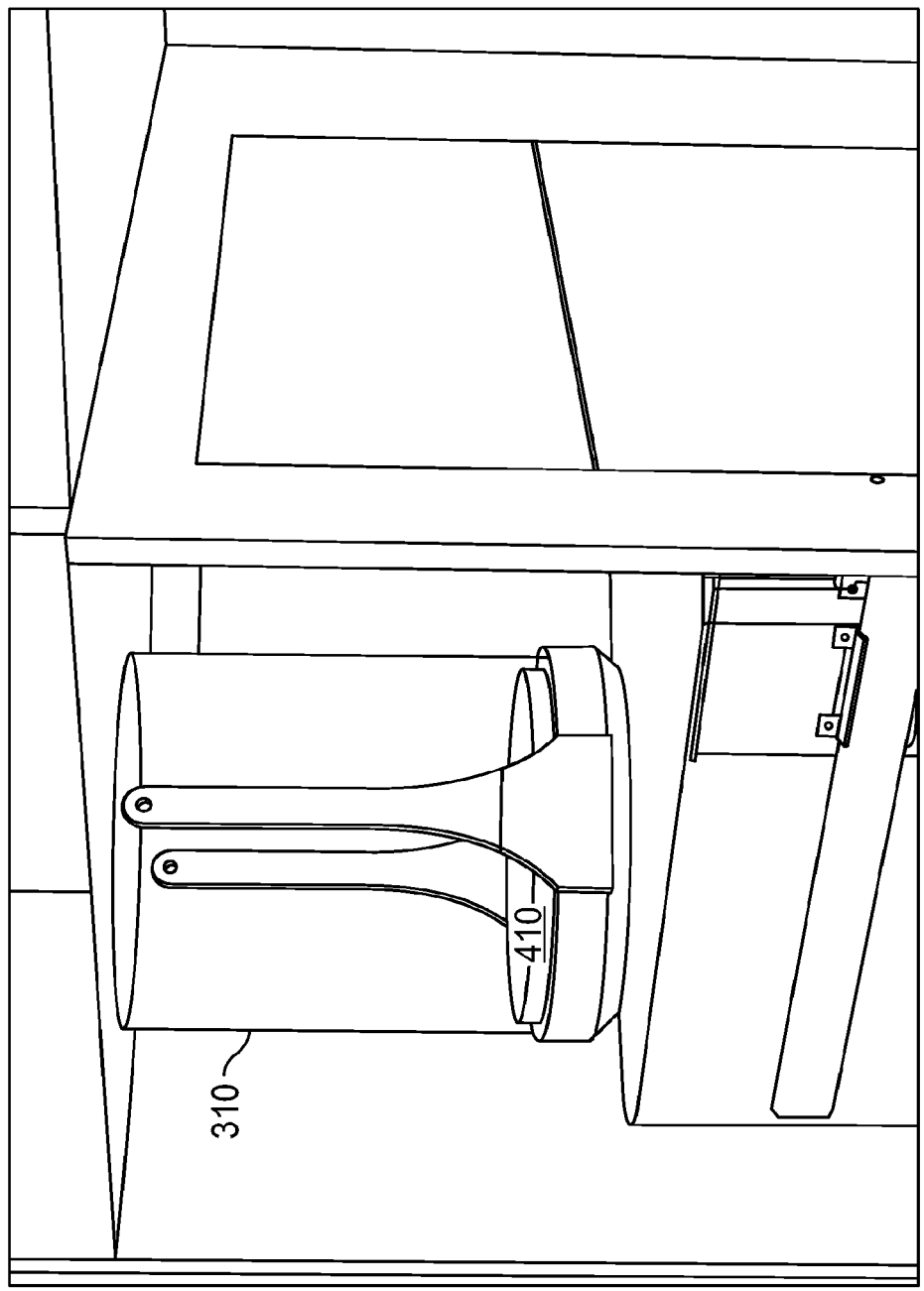
Figure 5J:
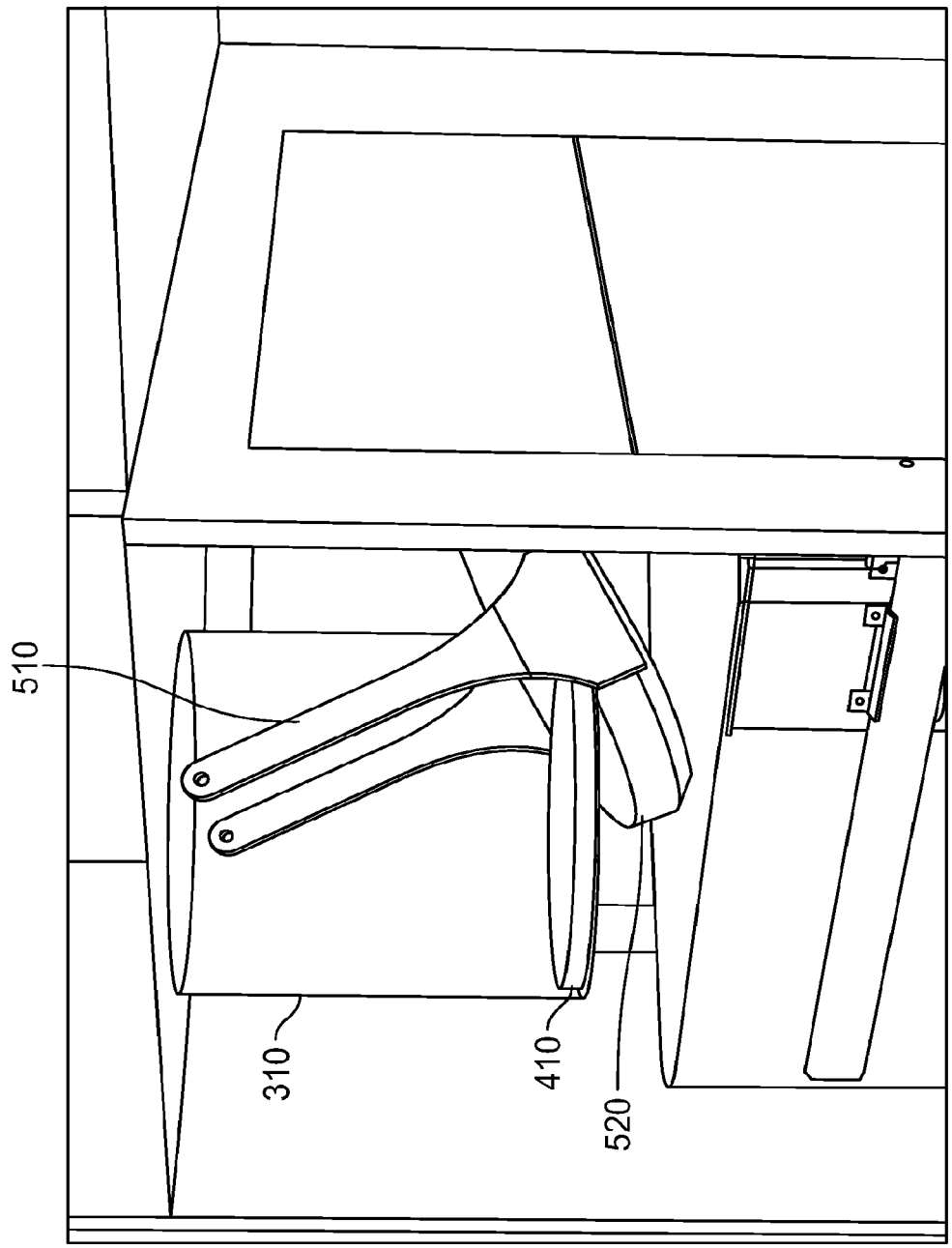
Figure 5K:
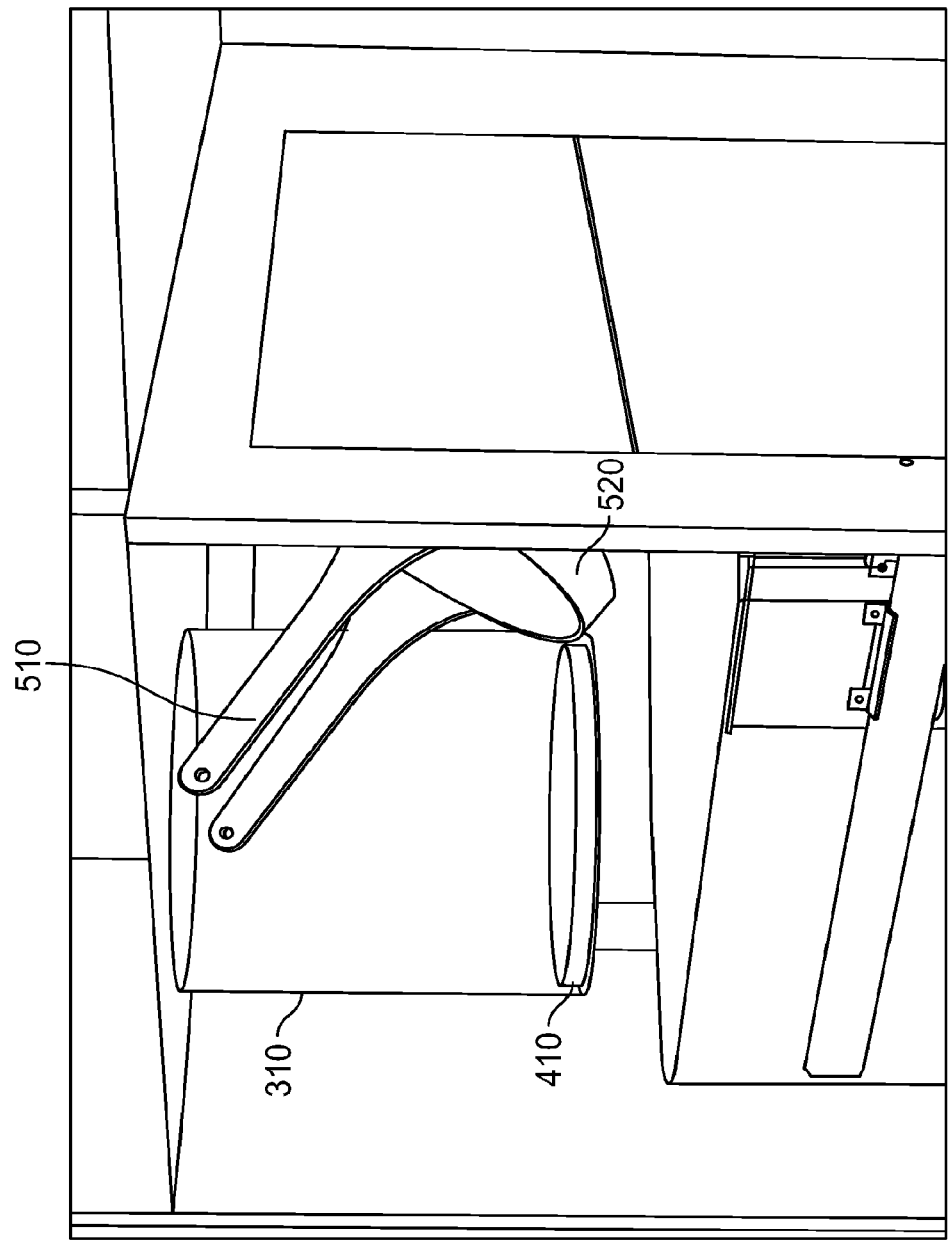
Figure 5L:
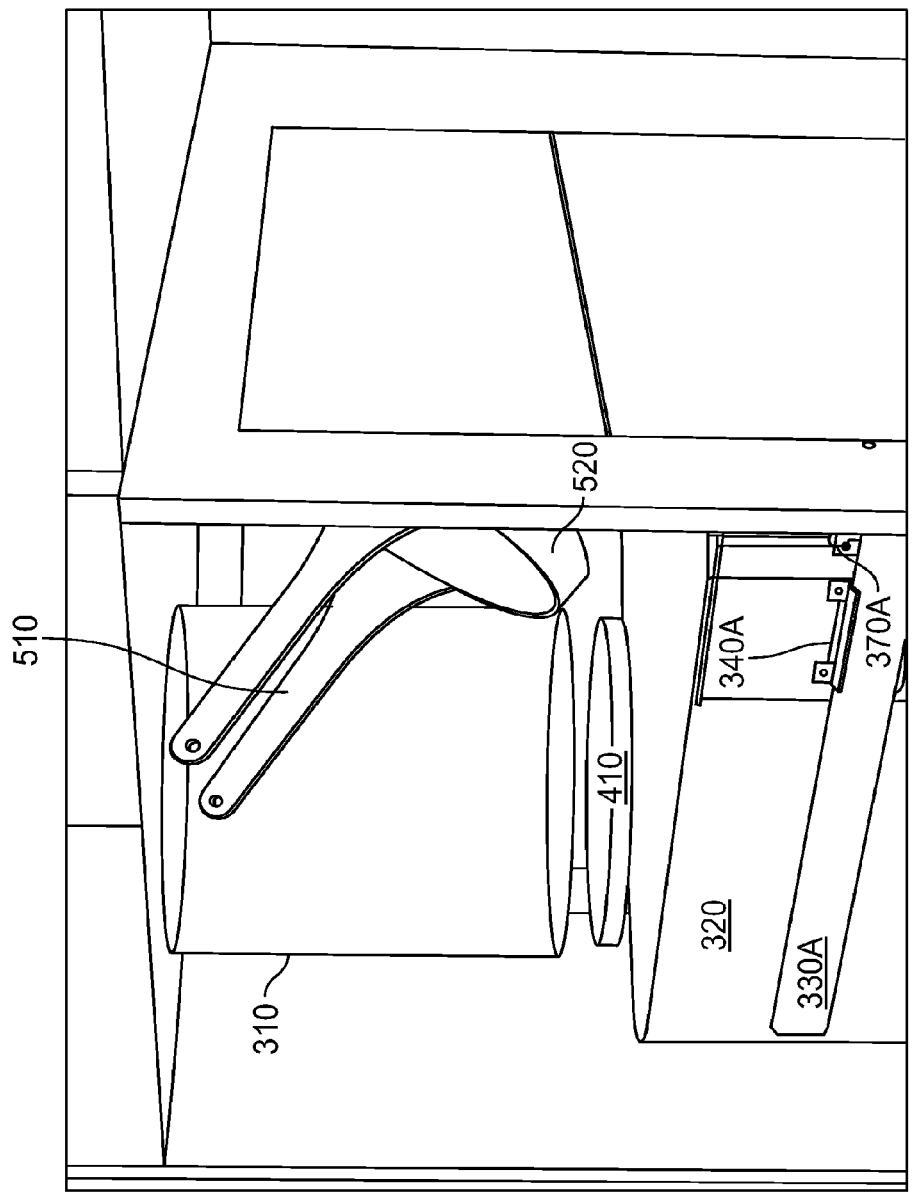
Figure 5M:
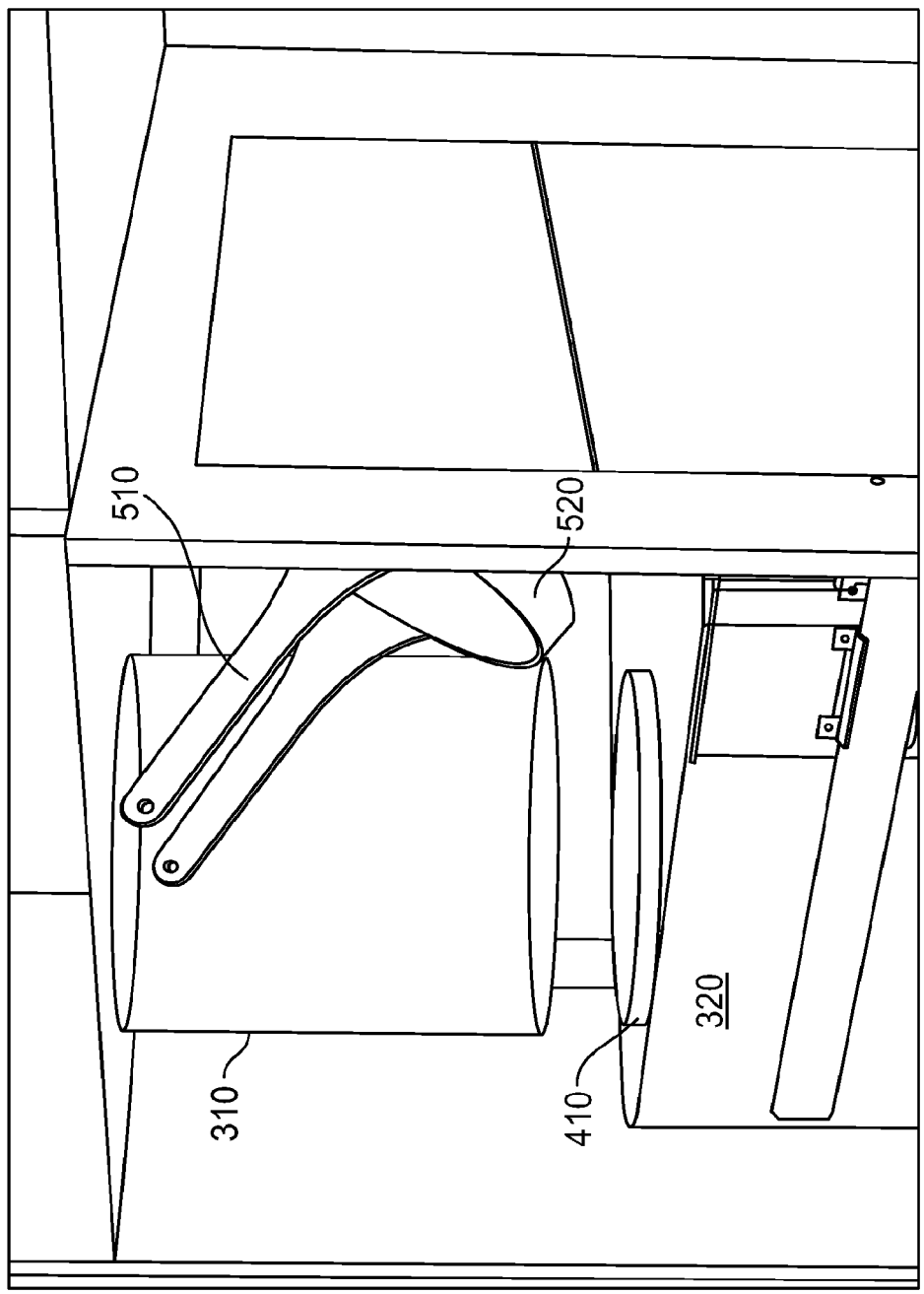
Figure 5N:
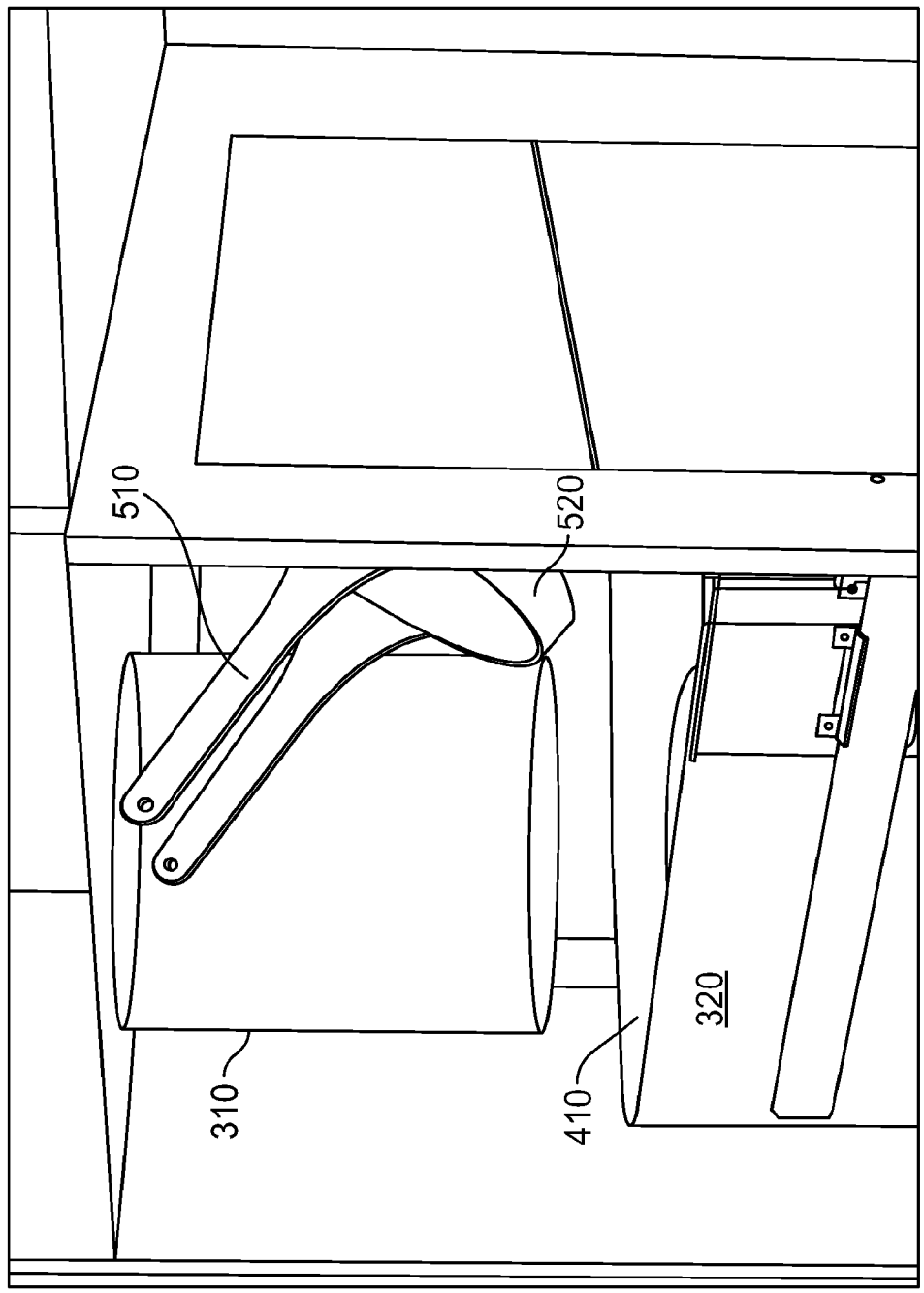
Figure 5O:
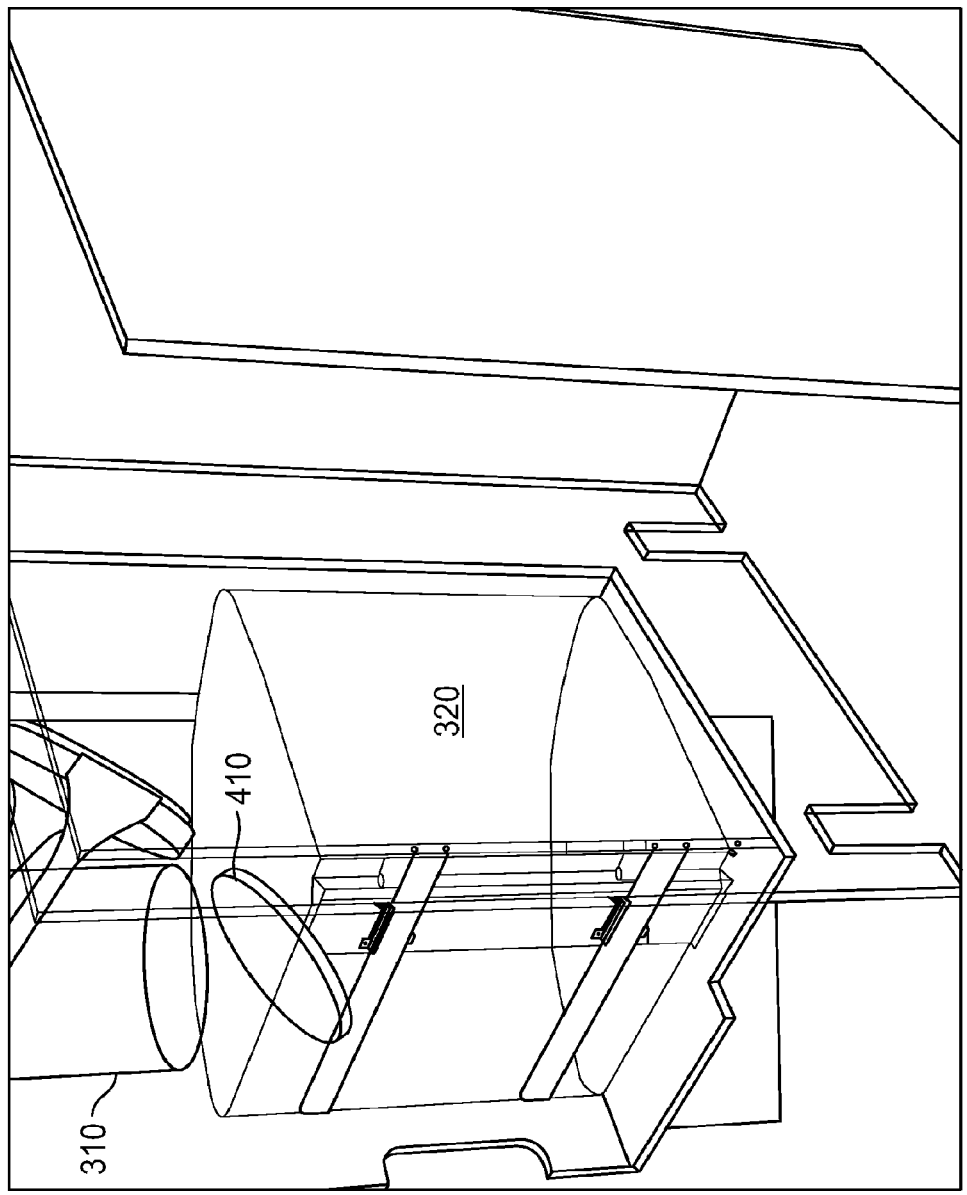
Figure 5P:
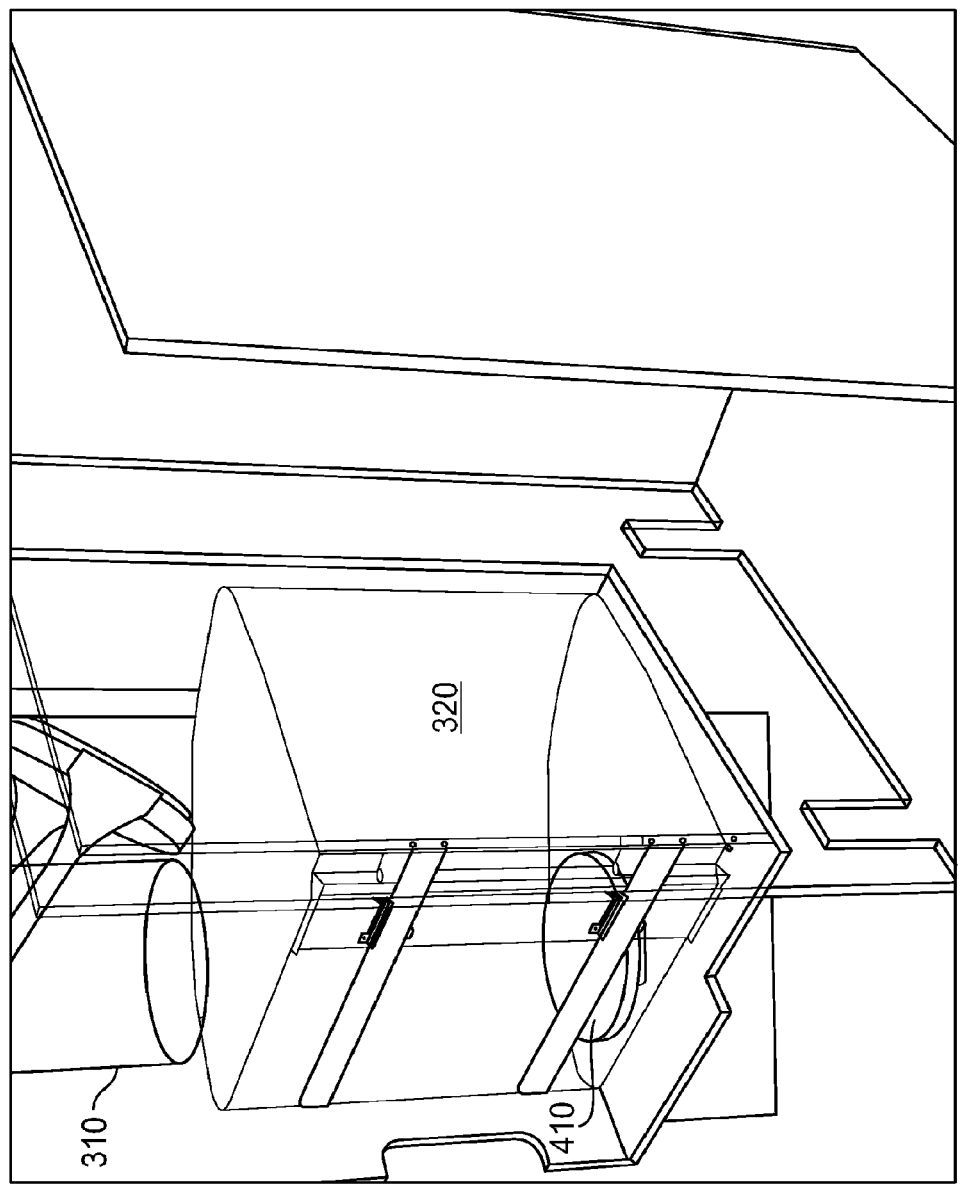
Figure 5Q:
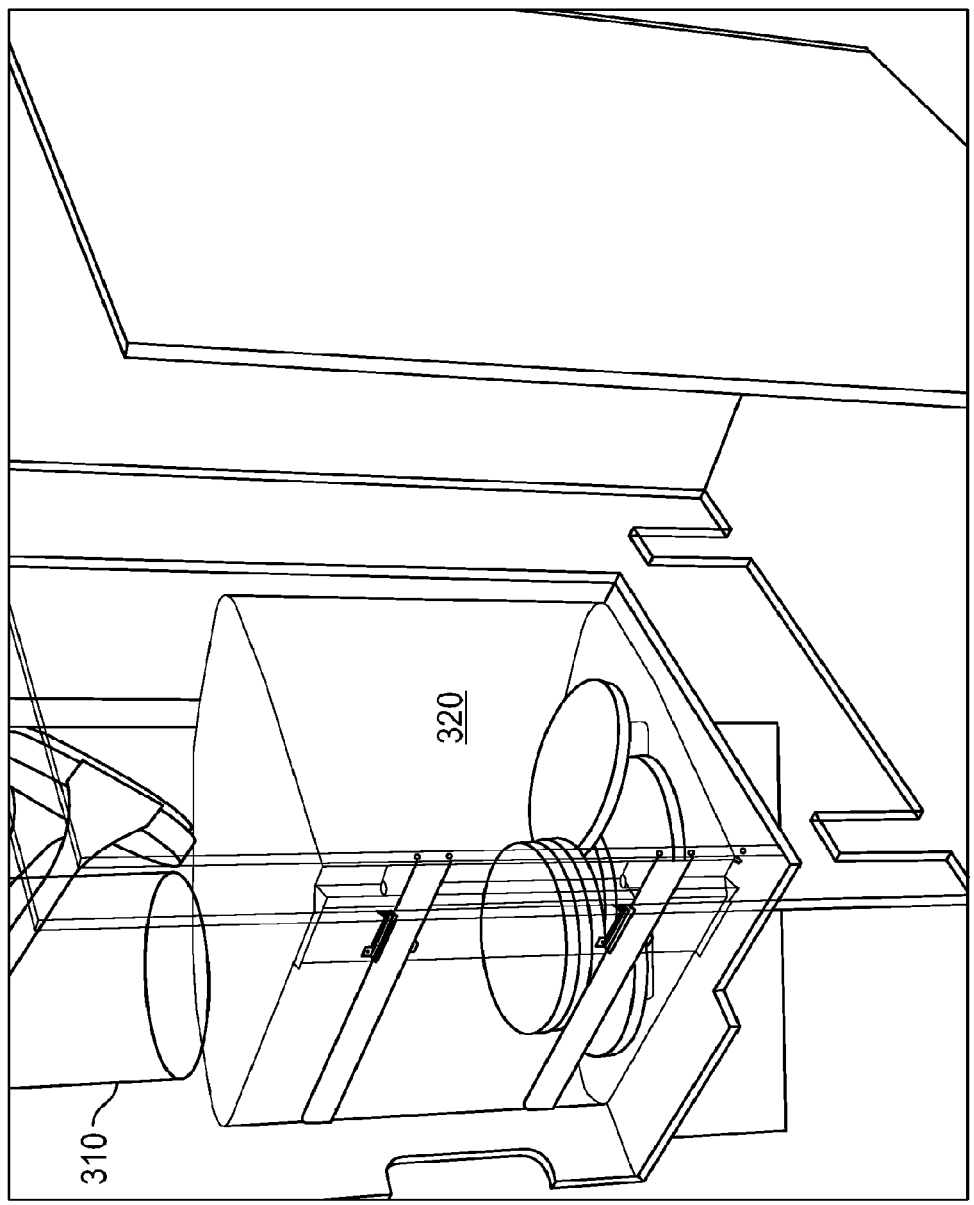
Figure 5R:
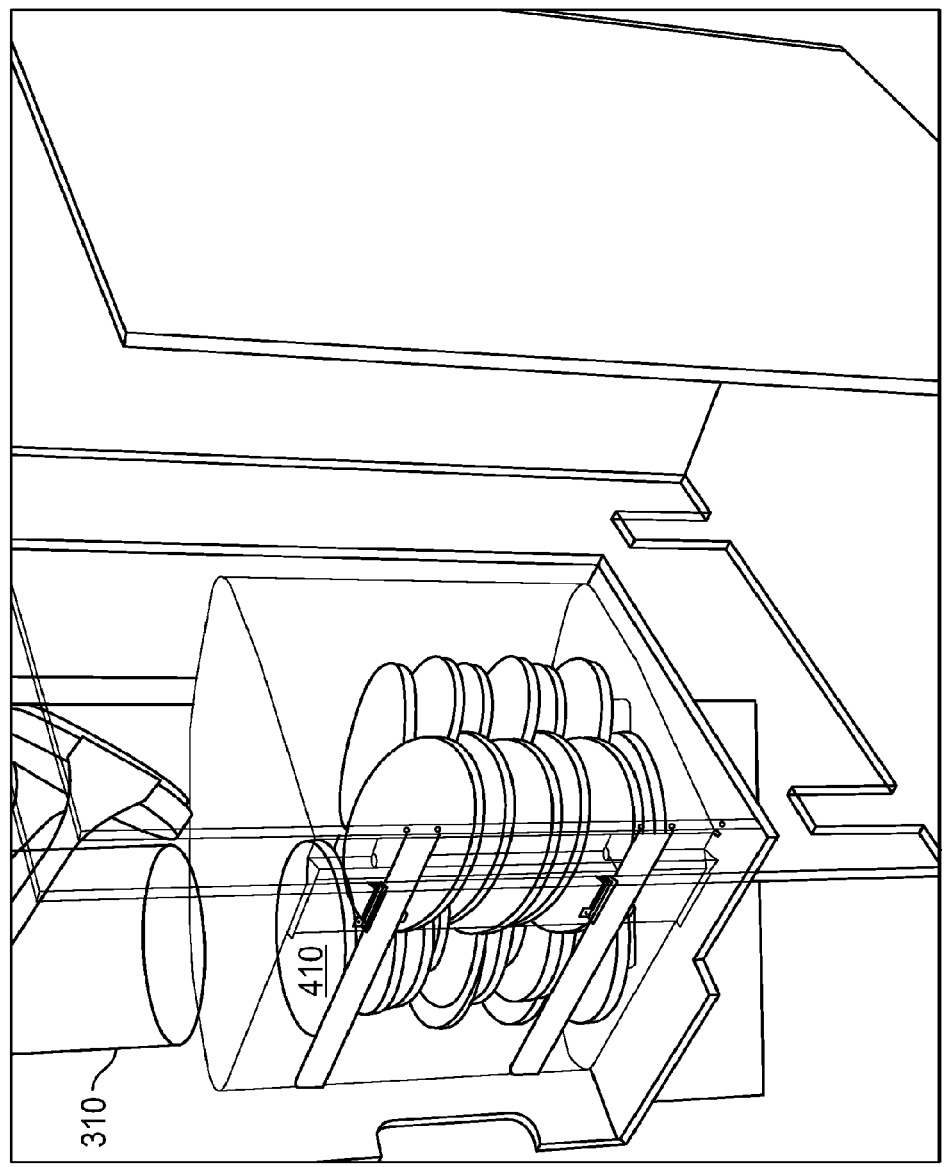
Figure 5S:
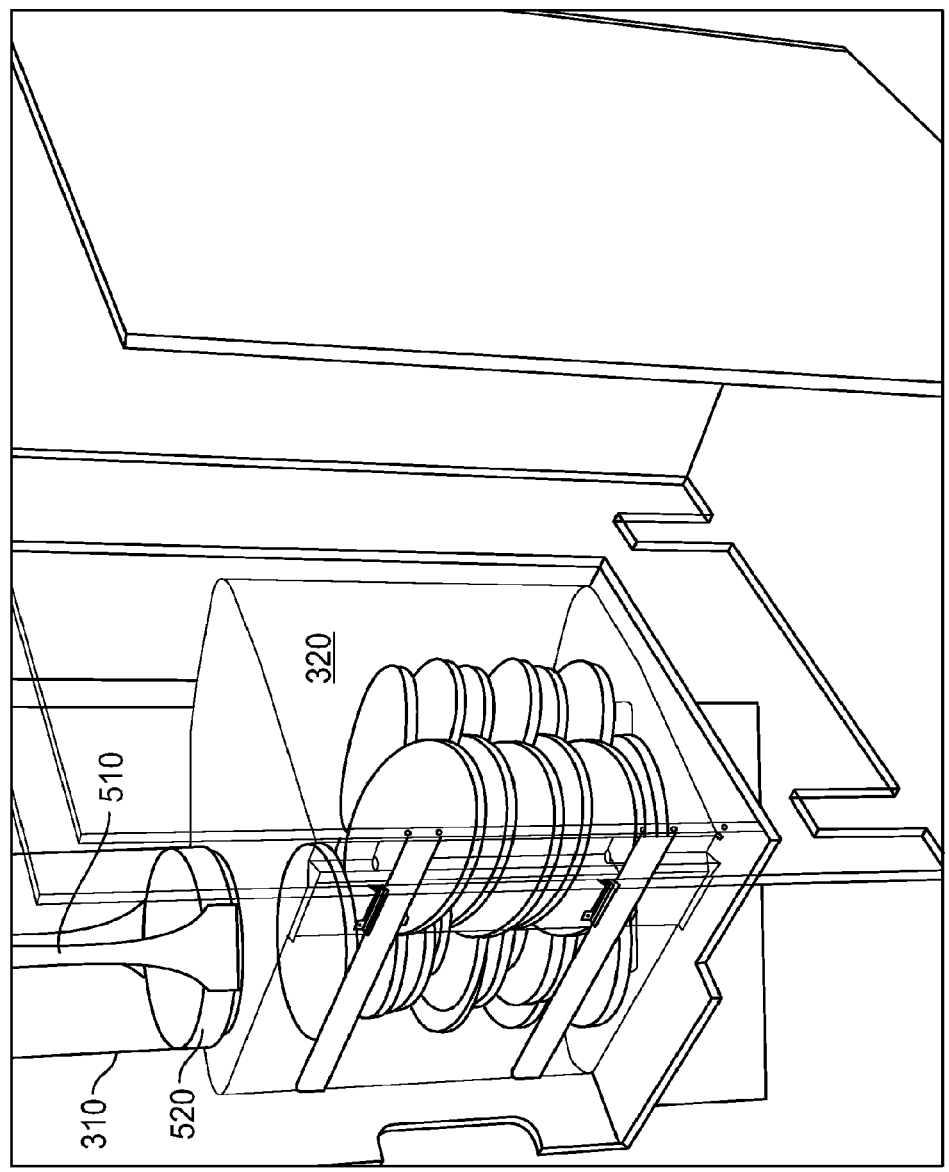

FIGS. 5A-5S illustrate exemplary operations of the IGTC of FIGS. 3A-4D in compacting trash. For ease of understanding, the compaction bin 310 is illustrated as partially transparent in FIGS. 5I-5S. As illustrated in FIG. 5A, the trash door 240 of the IGTC is normally in a closed position until a cabin crew member decides to insert trash into the IGTC. In some embodiments, when the cabin crew member approaches the IGTC with some in-flight trash, an OPEN DOOR button on the UIP 250 may be pressed and the IGTC automatically open the trash door 240. In other embodiments, the trash door 240 may be manually opened by the cabin crew member. The trash door 240 may then swing open as illustrated in FIG. 5B-5D to provide access for inserting trash into the IGTC.

After the trash door 240 is opened, the trash is deposited through the recess 260 into the trash receptacle above the compaction bin 310. As illustrated in FIG. 5E, trash 410 (e.g., empty beverage containers) may be easily inserted into the IGTC through an opening behind the trash door 240. Slanted sides and/or top of the recess 260 may help guide trash into the opening. After the trash is completely inserted into the trash receptacle via the opening as illustrated in FIG. 5F, the cabin crew member may press a button on the UIP 250 and/or manually close the trash door 240 as illustrated in FIG. 5G.

After there is a suitable amount of trash in the compaction bin 310 and/or trash receptacle, a COMPACT button on the UIP 250 may be pressed to start a compaction process while the trash door 240 is closed. In some embodiments, the IGTC may automatically detect that the compaction bin 310 and/or trash receptacle is full enough to start a compaction cycle, and the compaction cycle may be automatically initiated when the trash door 240 is closed. The IGTC unit may not perform a compaction cycle while the trash door 240 is open for safety purposes, and may include a safety interlock to prevent compaction from occurring when the trash door 240 is opened. The trash compaction process may be repeated for several cycles, after which the compacted trash may be emptied from the compaction bin 310 into the collection bin 320 below. The compacted trash may be deposited into the collection bin 320 before the compaction bin 310 is full.

FIG. 5H illustrates trash 410 within the compaction bin 310 prior to the beginning of a compaction cycle of the IGTC. When the compaction cycle begins, the actuator above the trash receptacle pushes the trash within the receptacle down into the compaction bin 310. The actuator may have a curved lower surface that presses down onto the trash 410 such that the trash 410 is directed more toward the center of the compaction bin 310 than the sides of the compaction bin 310. In other words, the lower surface of the actuator may be sloped upward from the outer edges to the center. By directing trash more toward the center of the compaction bin 310 than the sides of the compaction bin 310, load balance may be improved, the compacted trash may be less likely to jam during operation of the IGTC, and the compacted trash may be more easily ejected from the compaction bin 310 after compaction. After the actuator has compacted the trash 410, the compacted trash 410 is generally in the form a disc as illustrated in FIG. 5I. In various embodiments, the compacted trash 410 may be thicker at the center than at the edges, be formed in a meniscus shape, or have other non-uniformities in its shape. In general, the compacted trash 410 may have a significantly larger width than height, and be formed in a shape of a cookie, a platter, a disc, a coin, a puck, or the like.

After one or more compaction cycles are complete, the compacted trash may be ejected from the compaction bin 310. The ejection may be activated by a cabin crew member via the UIP 250, via remote control such as from the cockpit via a communications network, automatically based on how full the compaction bin 310 has become, or automatically based on a number of compaction cycles performed since the prior ejection of compacted trash was performed. To eject the compacted trash, swing beams 510 may swing a lower lid 520 out from below the compaction bin 310 as illustrated in FIGS. 5J and 5K in a manner similar to that of a pendulum. By swinging the lower lid 520 out from below the compaction bin 310, space may be conserved in the IGTC installation. The lower lid 520 may be constructed with a recessed center facing the interior of the compaction bin 310 such that the lower lid 520 clears the sides of the compaction bin 310 as the lower lid 520 swings out from under the compaction bin 310.

After the lower lid 520 has swung out of the way of the bottom opening of the compaction bin 310, the compacted trash 410 may ejected from the compaction bin 310 into the collection bin 320 disposed below the compaction bin 310 as illustrated in FIGS. 5L-5P. In some embodiments, the actuator is used to eject the compacted trash 410 through the opened bottom on the compaction bin 310. As illustrated in FIGS. 5Q-5R, the IGTC may perform multiple compaction cycles by which compacted trash is ejected from the compaction bin 310 into the collection bin 320 before the collection bin 320 becomes full.

After the compacted trash is ejected from the compaction bin 310 into the collection bin 320, the swing arm 510 may swing the lower lid 520 back into the closed position as illustrated in FIG. 5S. The lower lid 520 is only in an open position during ejection of compacted trash, and is returned to a closed position before more trash is inserted into the IGTC or another compaction cycle is performed.

In various other embodiments, the bottom of the compaction bin 310 may be opened in other ways and using other mechanisms to eject the compacted trash into the collection bin 320. For example, the lower lid 520 may slide, be hinged or be rotated outward in a horizontal direction from the bottom surface of the compaction bin 310, or the lower lid 520 may comprise two halves each of which are each swung, hinged, rotated, or slid away from the bottom surface of the compaction bin 310 in order to open the bottom surface thereof to eject the compacted trash.

Figure 6A:
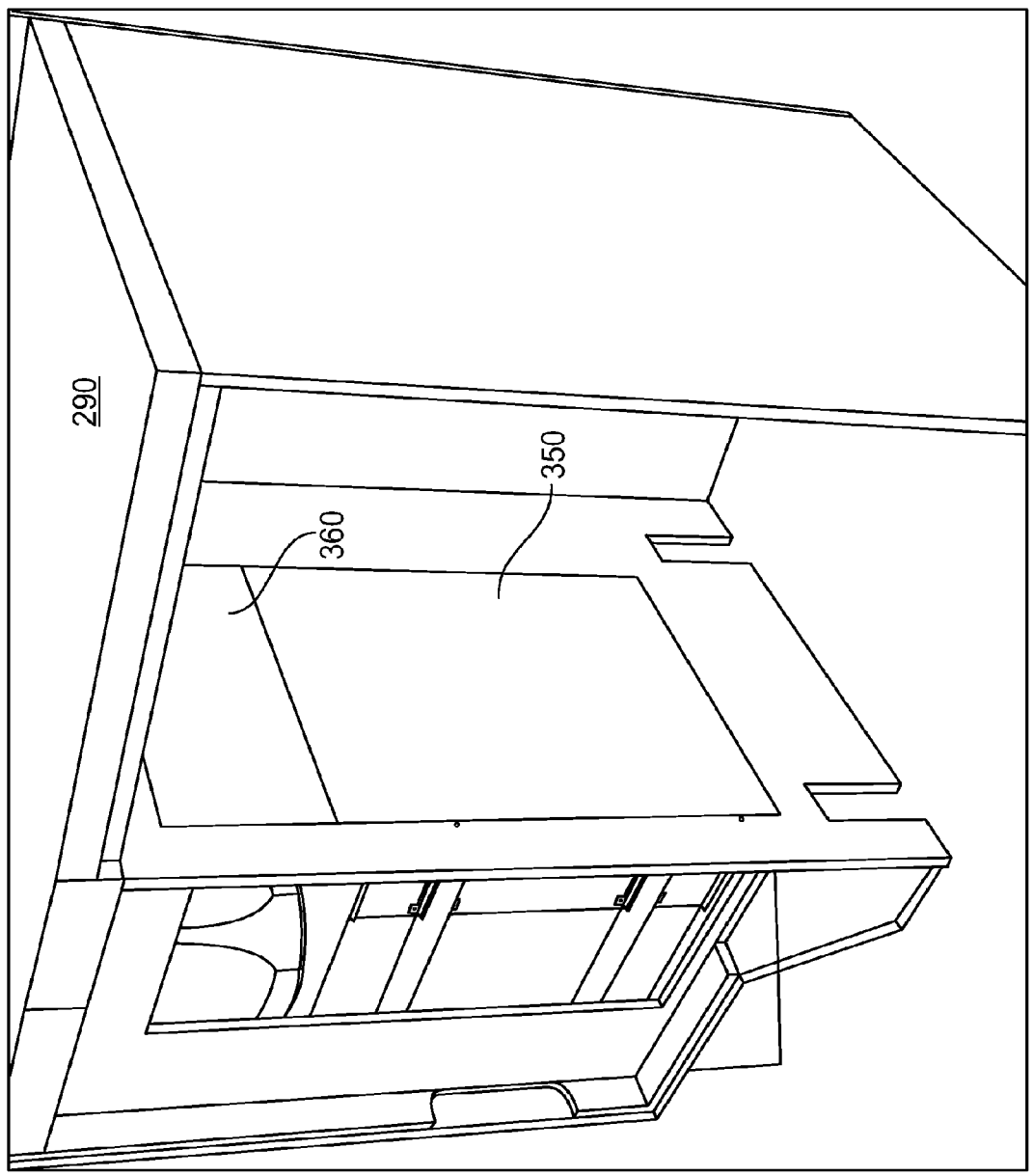
Figure 6B:
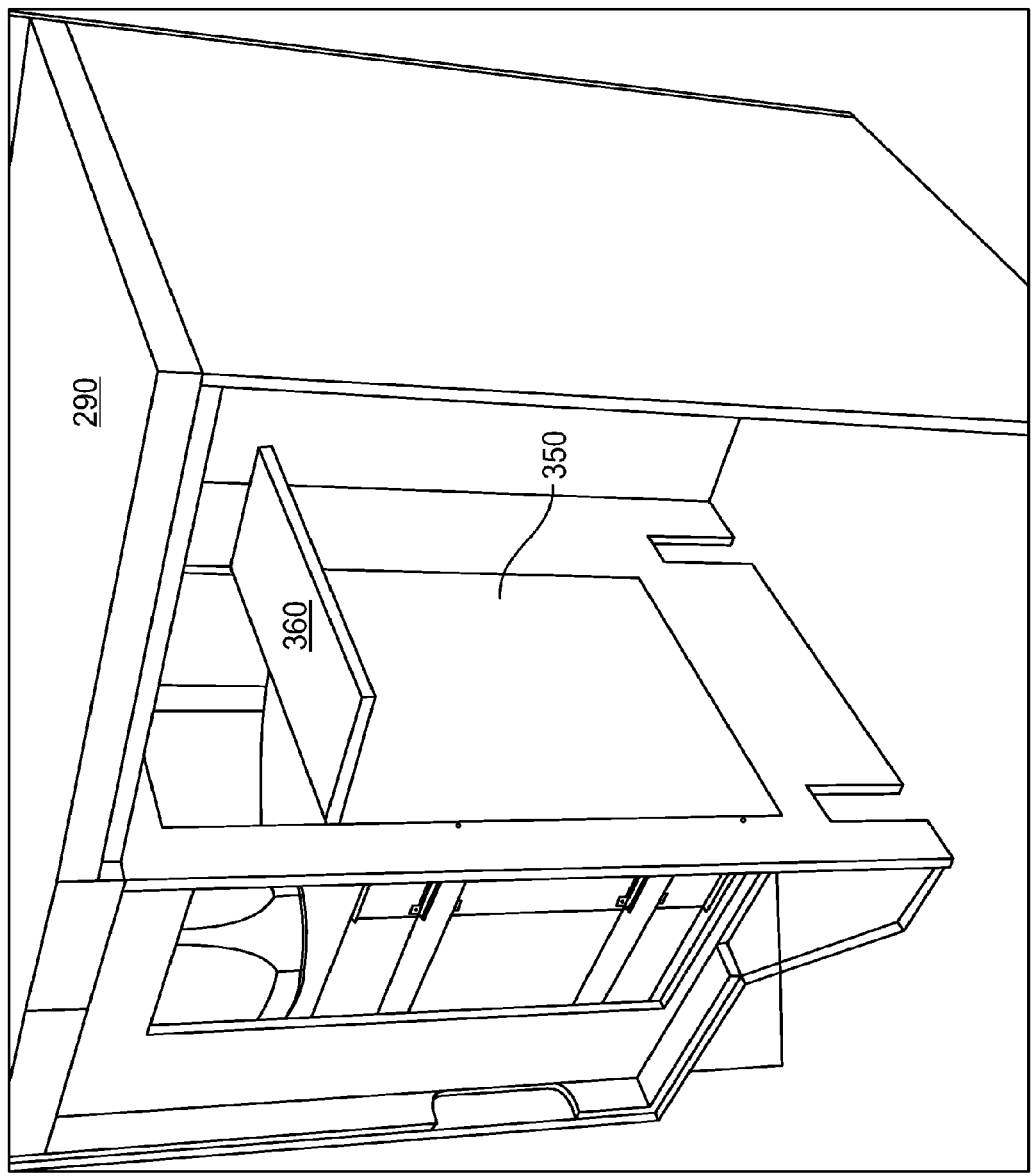
Figure 6C:
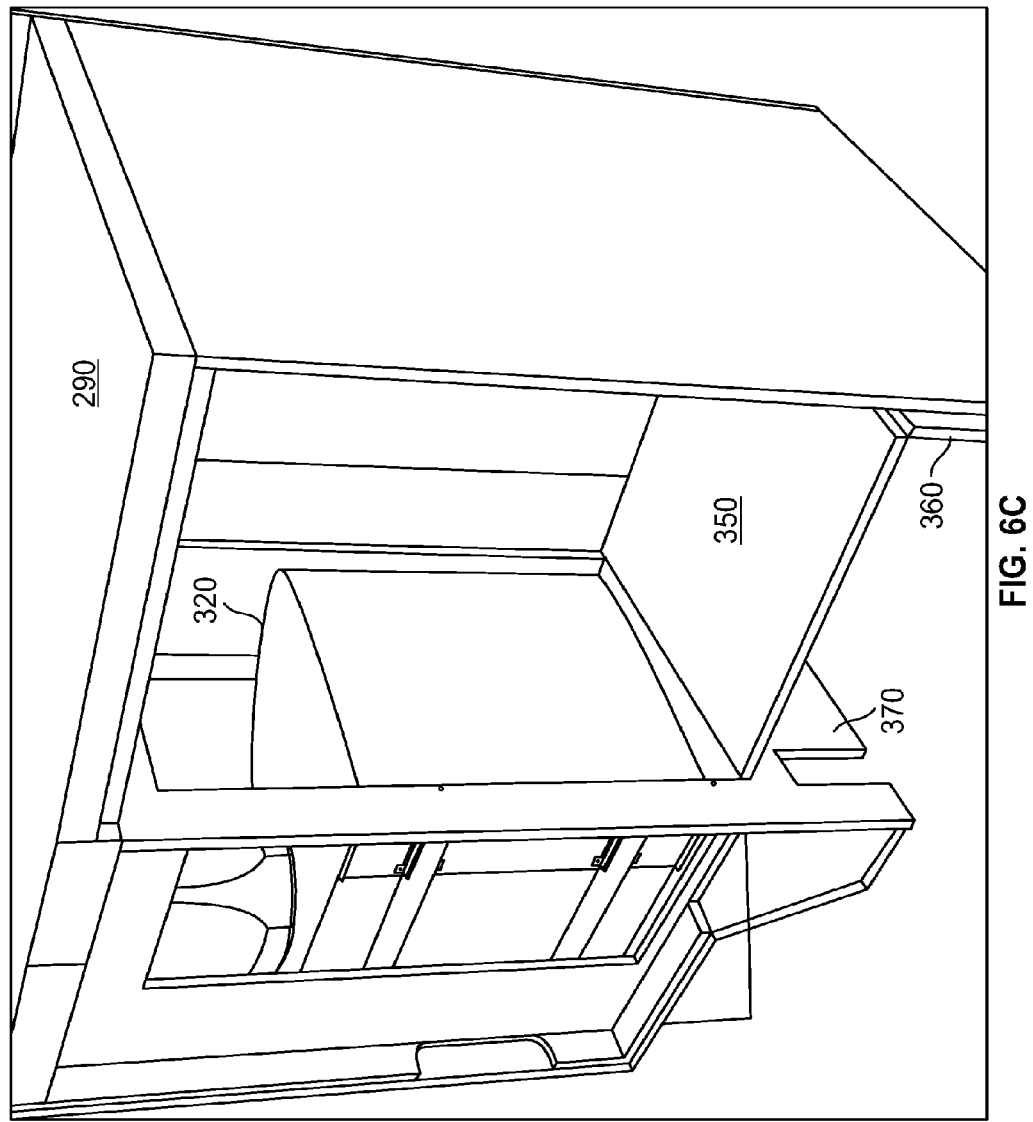
Figure 6E:
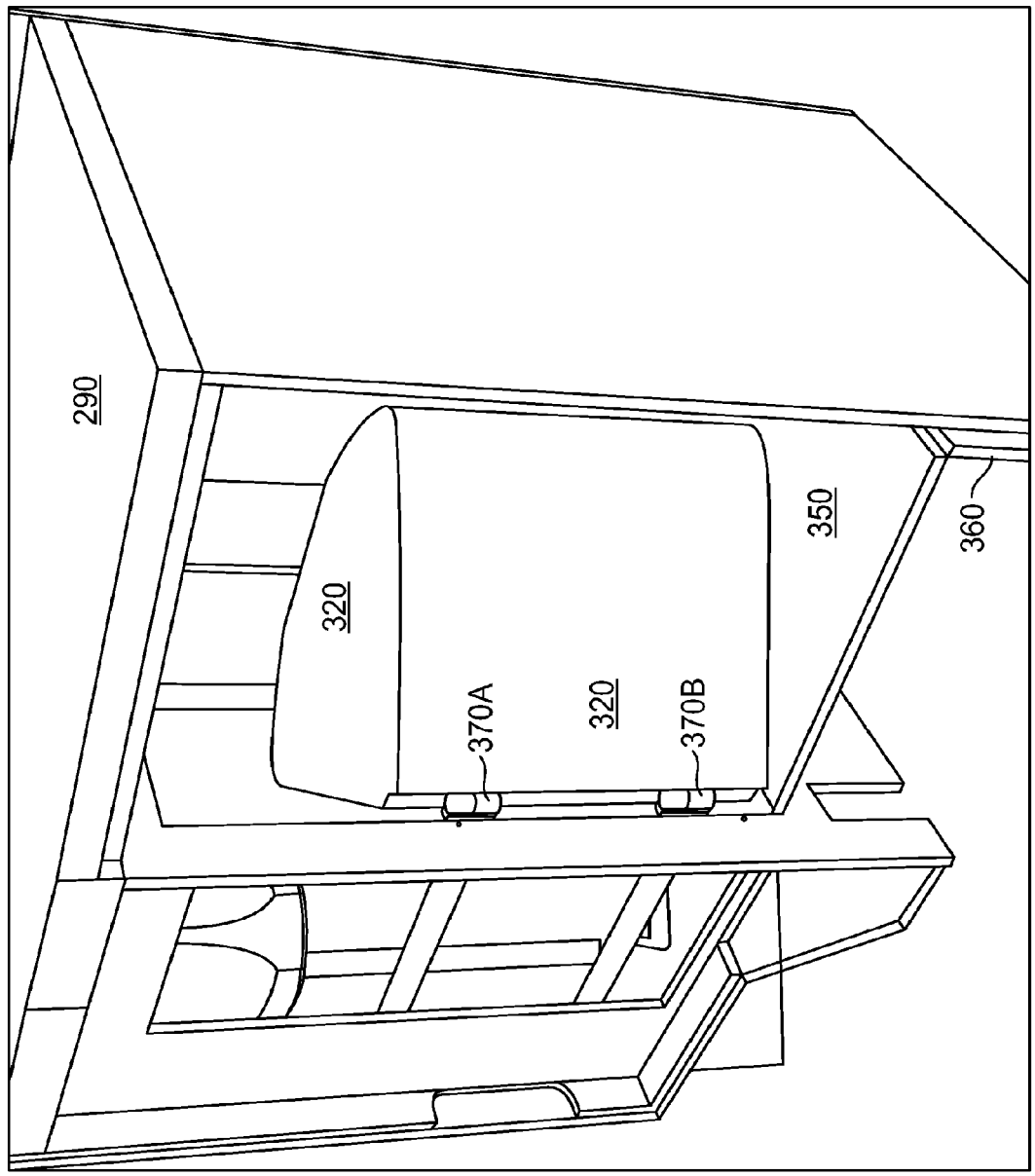
Figure 6F:
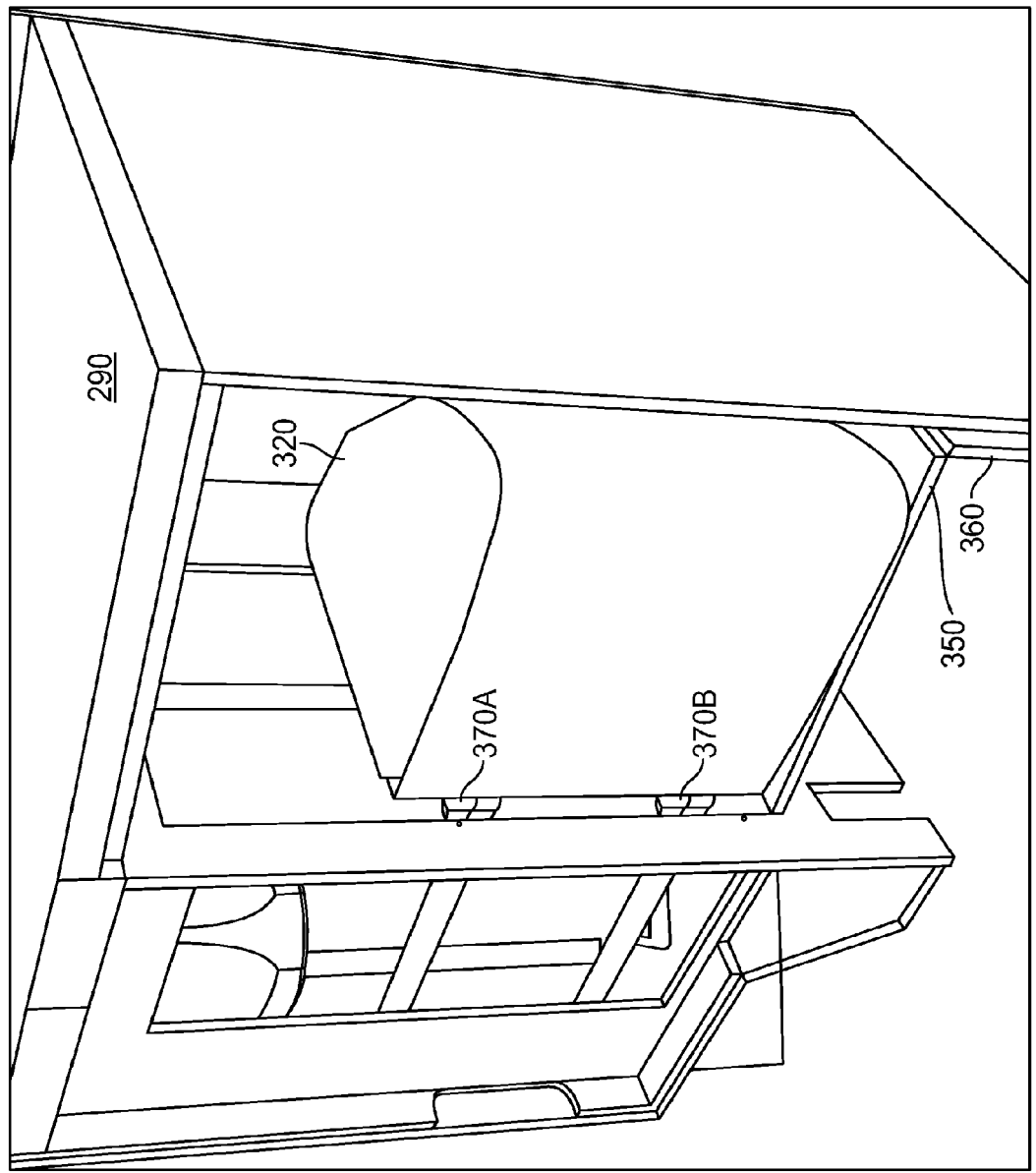
Figure 6G:
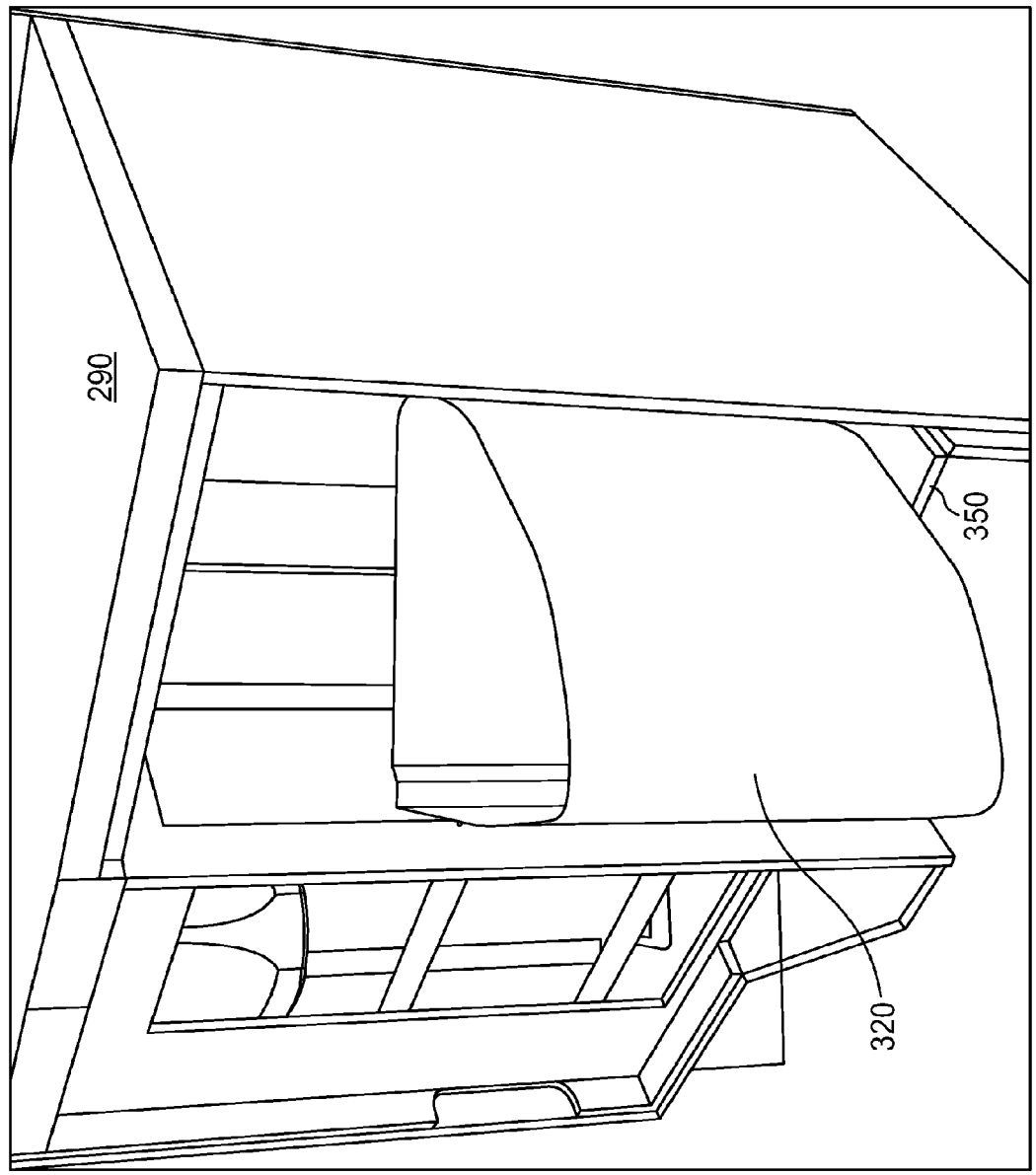

FIGS. 6A-6I illustrate exemplary operations of the IGTC of FIGS. 3A-5S in removing compacted trash. After the collection bin 320 becomes full, or when a cabin crew member or aircraft service/maintenance personnel otherwise desires to remove compacted trash from the collection bin 310, the access door panel 360 is tilted open as illustrated in FIGS. 6A-6B. After the access door panel 350 is also tilted open, the access door panel 360 becomes a support for the horizontally disposed open access door panel 350 as illustrated in FIG. 6C. In this configuration, the horizontally disposed open access door panel 350 is supported on one side by hinges attached to the partition 370 adjacent to the collection bin 320, and on the other side by the open access door panel 360.

Figure 6I:
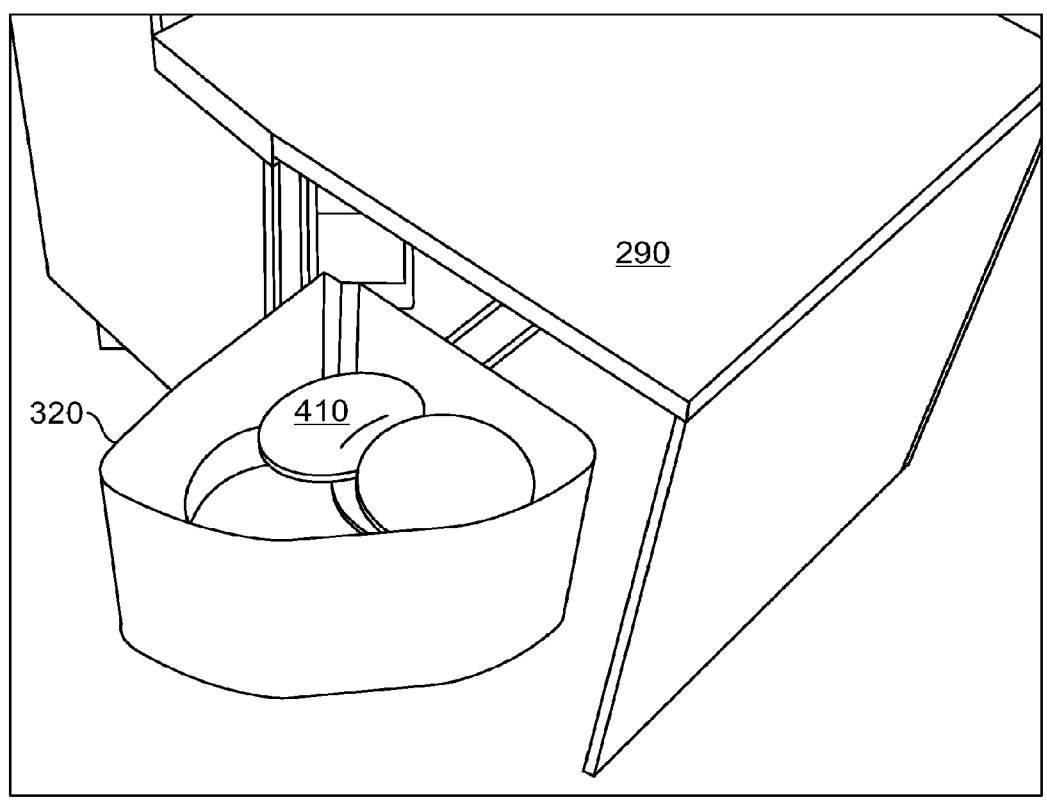

As illustrated in FIG. 6D, the collection bin 320 is slid to the right onto a top surface of the horizontally disposed open access door panel 350. Thereafter, as illustrated in FIG. 6E-6H, the collection bin 320 is rotated outward about the hinges 370A and 370B over the top surface of the horizontally disposed open access door panel 350 until the collection bin 320 is substantially no longer below the counter 290 of the galley corner 200. As illustrated in FIG. 6I, the compacted trash 410 within the collection bin 320 may be easily accessed and removed.

FIG. 7 illustrates exemplary hidden operational components of the IGTC disposed behind the wall panel 270 above the level of the counter 290. The illustrated components include an E-box LRU 705 and a hydraulic system LRU 710.

The E-Box LRU includes an electronic system controller for the IGTC. The E-Box LRU 705 may interface with the UIP 250 to control the hydraulic system LRU 710. The electronic system controller of the E-box LRU 705 may include a microprocessor-driven control system, fuse protection, electro-magnetic interference (EMI) protection, a power converter transformer, and an external sensor array.

The Hydraulic System LRU 710 includes a compactor actuator 715, a pump assembly 720 including a hydraulic pump and a hydraulic fluid reservoir 725. The actuator is disposed above the trash receptacle into which trash is inserted via the recess 260 in the wall panel 270. The actuator compacts the trash inserted into the receptacle into the compaction bin 310 disposed below the receptacle. The hydraulic system LRU 710 may also include a hydraulic pump motor, motor driver electronics, hydraulic manifold, support assembly (collar), 4-way control valve, pressure transducer, pressure relief valve, fluid filter, ram sensor, and fluid level sensor.

The hydraulic pump motor provides power to compact the trash using the actuator. The motor may drive a hydraulic pump within the pump assembly that pumps fluid from the hydraulic fluid reservoir 725 to the actuator. The actuator may be, e.g., a three- or multi-stage telescopic actuator. System pressure may be monitored by the system controller through a pressure transducer. When the system pressure reaches a predefined amount (e.g., 3000 pounds per square inch (psi)), power to the coil of the four-way hydraulic control valve may be removed and a spring-return action of the valve returned to a "retract" position. The actuator may be retracted until it is fully retracted and the ram sensor may be activated, signaling the controller to stop the motor driver from operating the motor.

The hydraulic actuator may be made of, e.g., aircraft alloy steel. The three-stage cylinders and seals may be designed to meet a fatigue life of at least one million cycles as well as required burst pressures. This high-strength design enables the actuator to reach high compression force on a continual basis without sacrificing a gross weight penalty.

The motor used in the hydraulic system LRU 710 is preferably a brushless DC motor designed to start smoothly under load and operate at any speed without sacrificing efficiency. The system controller preferably monitors power consumption and maximizes the motor speed at all times in order to meet predefined (e.g., 1000 watt (W)) power consumption requirements and minimize the compaction cycle duration as a convenience to the operator. The pump may also preferably be designed to provide high pressure at low motor speed where the load is highest.

The IGTC system may be powered by 3-phase variable-frequency aircraft power or may be adapted to other input power sources. The IGTC may be independent of all other galley components and may easily be integrated into the structure of the galley work deck.

Operation of the IGTC may be via a locally mounted UIP 250, providing push button operation, lamp indications and text messages, as well as any other user input and output. The IGTC may also be operated via remote control. The IGTC system preferably integrates with the aircraft's galley system via a Controller Area Network (CAN) bus interface (the galley data bus) to the galley network controller (GNC). The GNC preferably handles all network communications and arbitrates cooperative power control in the galley group.

In various embodiments, the IGTC system may meet the following specifications:

Performance:
Compaction pressure: 316 psi
Volume compression: 22:1
Aircraft interface:
Custom fit LRU dimensions
  Door opening: 203×216 millimeters (mm) (8×8.5 inch (in))
  Composite trash bin: 508 mm (20 in) height, 106 liter (L) capacity
Compaction bin (chamber) capacity: 23 L
User interface panel: 114×83 mm (4.5×3.25 in)
Electrical: 115/220 volts (V), 3-phase, 360-800 cycles per second (Hz), 1.0 kilo volt-amp (KVA) (max)
Weight: 75 kilogram (kg), including composite collection bin
Consumable Trash Container
Heavy-duty polyethylene bag
Form-fitted to collection bin
Withstands ruptures
Disposable
Easy to install and remove
Recyclable The embodiments described herein may comprise a memory for storing program data, a processor for executing the program data, a permanent storage such as a disk drive, a communications port for handling communications with external devices, and user interface devices, including a display, keys, etc. When software modules are involved, these software modules may be stored as program instructions or computer-readable codes, which are executable by the processor, on a non-transitory or tangible computer-readable media such as read-only memory (ROM), random-access memory (RAM), a compact disc (CD), a digital versatile disc (DVD), magnetic tapes, floppy disks, optical data storage devices, an electronic storage media (e.g., an integrated circuit (IC), an electronically erasable programmable read-only memory (EEPROM), and/or a flash memory), a quantum storage device, a cache, and/or any other storage media in which information may be stored for any duration (e.g., for extended time periods, permanently, brief instances, for temporarily buffering, and/or for caching of the information). The computer-readable recording medium can also be distributed over network-coupled computer systems (e.g., a network-attached storage device, a server-based storage device, and/or a shared network storage device) so that the computer-readable code may be stored and executed in a distributed fashion. This media can be read by the computer, stored in the memory, and executed by the processor. As used herein, a computer-readable storage medium excludes any computer-readable media on which signals may be propagated. However, a computer-readable storage medium may include internal signal traces and/or internal signal paths carrying electrical signals therein Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as" or "for example") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

Although certain example methods and apparatus have been described herein, the scope of coverage of this patent is not limited thereto. On the contrary, this patent covers all methods, apparatus and articles of manufacture fairly falling within the scope of the claims of this patent.

What is claimed is:

1. A vertically operating space-efficient aircraft galley-mounted trash compaction system comprising:
    a vertically aligned and oriented compactor mechanism, trash receptacle, compaction bin, and collection bin where the compactor mechanism has an actuator for compacting trash in the compaction bin and is located above the trash receptacle, the trash receptacle is located above the compaction bin, and the compaction bin is located above the collection bin;
    a closeable trash door disposed to provide access to the trash receptacle;
    the compaction bin being disposed below the trash receptacle that receives trash therefrom, and having a closeable opening at a bottom end through which compacted trash is ejected and a swing arm coupled with a bottom lid, the swing arm operative to swing the bottom lid horizontally away from the bottom of the compaction bin to elect the compacted trash through the resulting opening at the bottom of the compaction bin;
    the compactor mechanism operatively coupled with the compaction bin to compact the trash within the compaction bin; and
    the collection bin disposed below the compaction bin that receives the compacted trash ejected from the compaction bin.

2. The trash compaction system of claim 1, wherein the compactor mechanism is cylindrical and compacted trash is ejected in a shape of a round platter having a width substantially greater than its height.

3. The trash compaction system of claim 1, wherein the compactor mechanism ejects the compacted trash into the collection bin according to at least one of a measured weight of the compacted trash, a measured volume of the compacted trash, a counted quantity of compaction cycles performed, and an elapsed time since a prior compacted trash ejection.

4. The trash compaction system of claim 1, wherein the collection bin includes a rail and glider by which the collection bin slides out from under the compaction bin, and a hinge by which the collection bin rotates out from under a counter below which the collection bin is stored.

5. The trash compaction system of claim 1, wherein the trash is compacted into a disc having a width essentially equal to a width of the compaction bin and a height substantially less than a width of the compaction bin.

6. The trash compaction system of claim 1, wherein the closeable trash door is disposed in a tapered recess in a wall having a narrower dimension at an entry into the trash receptacle than at the wall.

7. The trash compaction system of claim 1, further comprising a user interface panel by which the trash compaction system may be locally controlled.

8. The trash compaction system of claim 1, further comprising a communications network interface by which the trash compaction system may be remotely controlled.

9. The trash compaction system of claim 1, further comprising an access door that swings down to become a support surface for the collection bin, the collection bin operative to swing out from under the compaction bin over the support surface of the access door.

10. A method for compacting trash in a space-efficient manner in a vehicle galley comprising:
    providing a vertically aligned and oriented compactor mechanism, trash receptacle, compaction bin, and collection bin where the compactor mechanism has an actuator for compacting trash in the compaction bin and is located above the trash receptacle, the trash receptacle is located above the compaction bin, and the compaction bin is located above the collection bin;
    collecting trash in the vertically oriented compaction bin located above and proximal to the collection bin, the compaction bin having a selectively closeable opening at its bottom end;
    compacting the trash in the compaction bin;
    opening the selectively closeable opening by swinging an arm coupled with a bottom lid away from the bottom of the compaction bin; and
    ejecting the compacted trash vertically from the compaction bin into the collection bin via the selectively closeable opening by activating the actuator to push the compacted trash though the bottom on the compaction bin.

11. The method for compacting trash of claim 10, further comprising ejecting the compacted trash when at least one of a measured weight of the compacted trash, a measured volume of the compacted trash, a counted quantity of compaction cycles performed, an elapsed time since a prior compacted trash ejection, a received local ejection command input by a user, or a received ejection command is detected.

12. The method for compacting trash in a space-efficient manner in a vehicle galley of claim 10 in which the vehicle is an aircraft.

* * * * *